US005499334A

United States Patent [19]
Staab

[11] Patent Number: 5,499,334
[45] Date of Patent: Mar. 12, 1996

[54] METHOD AND SYSTEM FOR DISPLAYING WINDOW CONFIGURATION OF INACTIVE PROGRAMS

[75] Inventor: Sanford A. Staab, Woodinville, Wash.

[73] Assignee: Microsoft Corporation, Redmond, Wash.

[21] Appl. No.: 24,732

[22] Filed: Mar. 1, 1993

[51] Int. Cl.$^6$ .................................................. G06F 3/03
[52] U.S. Cl. .......................................... 395/157; 395/161
[58] Field of Search ................................... 395/153, 155, 395/157, 158, 161, 700

[56] References Cited

U.S. PATENT DOCUMENTS

| | | | |
|---|---|---|---|
| 5,079,695 | 1/1992 | Dysart et al. | 395/700 |
| 5,179,700 | 1/1993 | Aihara et al. | 395/157 X |
| 5,222,210 | 6/1993 | Leivian | 395/161 |

OTHER PUBLICATIONS

Mastering Windows 3.1 (Trademark of Microsoft Corporation) 1992, pp. 14–15, 65, 150 & 662.
Mastering Windows 3.1 (Trademark of Sybex Corporation) 1992, pp. 16–18 & 67.

*Primary Examiner*—Heather R. Herndon
*Assistant Examiner*—Cliff N. Vo
*Attorney, Agent, or Firm*—Seed and Berry

[57] ABSTRACT

A method and system for managing window configurations of a desktop configuration is provided. In a preferred embodiment of the present invention, a TopDesk system persistently saves the window configurations of currently-active programs of the computer system. These saved window configurations compose a saved desktop configuration. The TopDesk system displays within its window a representation of the saved desktop configuration. Each saved window configuration is displayed as a rectangle (called a ghost window) that is representative of the size and location of the saved window configuration. Each displayed rectangle preferably contains the title of the actual window for the corresponding program. The TopDesk system allows a user to move the displayed rectangles to modify the saved desktop configuration. The TopDesk system allows a user to activate a saved desktop configuration. During this activation process, the TopDesk system activates any currently-inactive programs that are associated with a saved window configuration and sets the actual window configuration of the program to the saved window configuration. Thus, a user can persistently save desktop configurations and efficiently activate a desktop configuration.

17 Claims, 40 Drawing Sheets

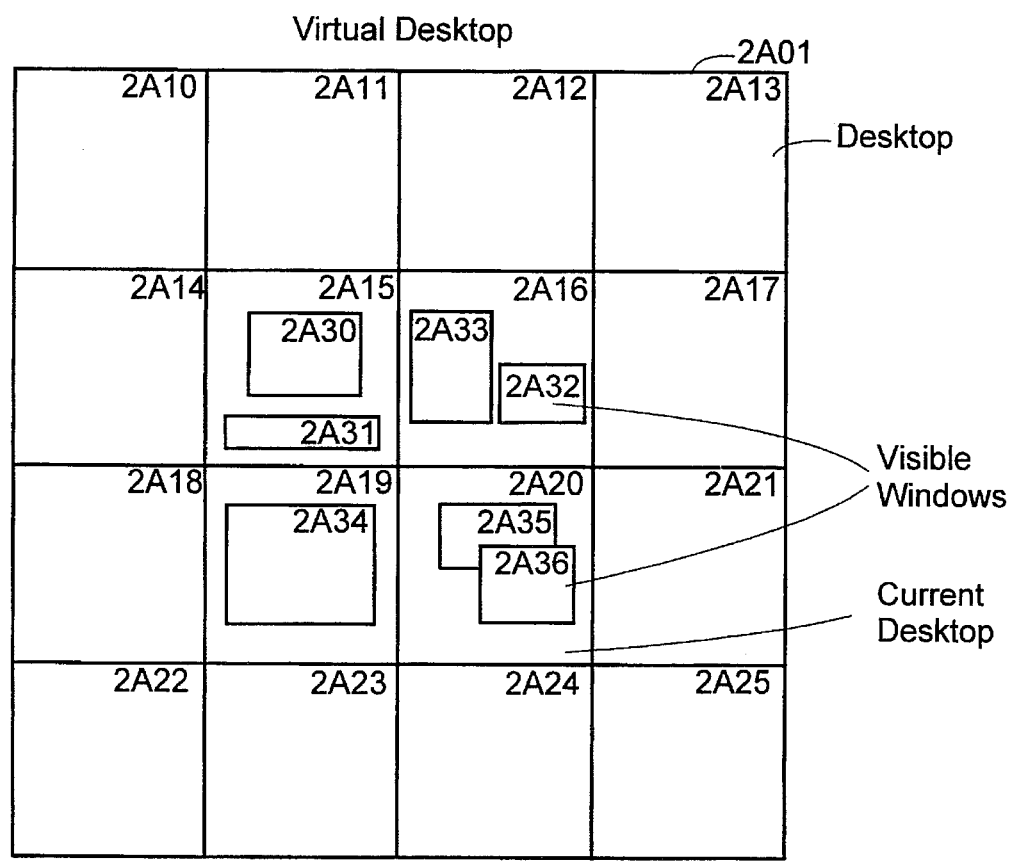
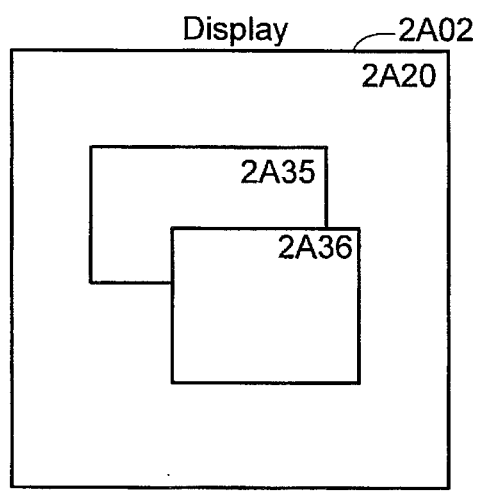
*Figure 2A*

VISIBLE WINDOW TABLE

| Title | Handle | Location | Min | Max | Ghost |
|---|---|---|---|---|---|
| Program Manager | hPM | RECT0 | | | |
| Mouse | hMouse | RECT1 | | | |
| Control Panel | HCP | RECT2 | | | |
| Print Manager | hPrntM | RECT3 | | | |
| Microsoft Project | hProj | RECT4 | | | |
| Microsoft Word | hWord | RECT5 | | | |
| Notepad | hNote | RECT6 | | | |
| Paintbrush | hPaint | RECT7 | | | |
| Write | hWrite | RECT8 | | | |
| Microsoft Excel | hExcel | RECT9 | | | |
| Terminal | hTerm | RECT10 | | | |
| Calculator | hCalc | RECT11 | | | |
| Calendar | hCal | RECT12 | | | |
| Cardfile | hCard | RECT13 | | | |
| Clock | hClock | RECT14 | | | |

1810

EXECUTABLE TABLE

| Title | FileName |
|---|---|
| Program Manager | pm.exe |
| Mouse | mouse.exe |
| Control Panel | cp.exe |
| Print Manager | printman.exe |
| Microsoft Project | project.exe |
| Microsoft Word | winword.exe |
| Notepad | notepad.exe |
| Paintbrush | pbrush.exe |
| Write | write.exe |
| Microsoft Excel | excel.exe |
| Terminal | terminal.exe |
| Calculator | calc.exe |
| Calendar | calendar.exe |
| Cardfile | cardfile.exe |
| Clock | clock.exe |

1830

GHOST WINDOW TABLE

| Title | Location |
|---|---|
| Program Manager | |
| Mouse | |
| Control Panel | |
| Print Manager | |
| Microsoft Project | |
| Microsoft Word | |
| Notepad | |
| Paintbrush | |
| Write | |
| Microsoft Excel | |
| Terminal | |
| Calculator | |
| Calendar | |
| Cardfile | |
| Clock | |

METHOD AND SYSTEM FOR DISPLAYING WINDOW CONFIGURATION OF INACTIVE PROGRAMS

DESCRIPTION

1. Technical Field

This invention relates generally to a computer windowing system and, more particularly, to a method for controlling the display of various window configurations.

2. Background of the Invention

Computer systems typically execute computer programs in a multitasking mode. In multitasking mode, several different computer programs can be executing concurrently. Operating systems control the multitasking process by selectively assigning the processor for a short period of time to each computer program. Computer systems, such as personal computers, typically have only one display device for displaying data that is visible to a user. Each computer program is generally written as if it is the only program outputting data to the display device. Multitasking operating systems coordinate the simultaneous display of output from different computer programs on the display device. These operating systems often employ windowing systems for coordinating the simultaneous display. These windowing systems assign each computer program a rectangular portion of the display device at which its output is displayed. This rectangular portion of the display device is known as a window. FIG. 1A shows a display device with three windows displayed. The display device 1A01 contains three windows 1A02, 1A03, and 1A04. In this example, the computer system is executing a check register program, a check writing program, and a payee list program concurrently. The check register program output is displayed in window 1A02, the check writing program output is displayed in window 1A03, and the payee list program output is displayed in window 1A04.

Most windowing systems implement what is referred to as the "desktop metaphor." According to this metaphor, the windows on a display can be arranged like sheets of paper on a desktop. That is, various windows can overlap and obscure portions of other windows just as sheets of paper on a desktop can overlap other sheets of paper. These windowing systems typically allow a user to specify the location and size (configuration) of each window on the display to create a particular "desktop" configuration. For example, a user who is writing checks for accounts payable may want to see a check register window, check writing window, and the payee list window arranged as shown in FIG. 1A. The user using a pointing device, such as a mouse, can direct the windowing system to modify the configuration of each window. By carefully moving and resizing the windows (modifying the window configurations), the user can generate the desktop configuration of FIG. 1A.

A user of a computer system may at different times desire to work with different desktop configurations. For example, the user may desire to use the desktop configuration of FIG. 1A when performing accounts payable tasks. Alternatively, the user may desire to use the desktop configuration of FIG. 1B when performing inventory control tasks. However, it can be time consuming for the user to modify each window configuration to generate the desired desktop configurations. Moreover, if the user needs to switch between the accounts payable task and the inventory control task frequently, the generating of the desired desktop configuration with each switch can adversely affect productivity.

SUMMARY OF THE INVENTION

It is an object of the present invention to provide a method and system for storing desktop configurations.

It is another object of the present invention for visually representing a window configuration for an inactive program.

It is another object of the present invention for managing the window configurations of various active and inactive programs.

These and other objects, which will become apparent as the invention is more fully described below, are provided by a method and system for managing window configurations of a desktop configuration. In a preferred embodiment of the present invention, a TopDesk system persistently saves the window configurations of the currently-active programs of the computer system. These saved window configurations compose a saved desktop configuration. The TopDesk system displays within its window a representation of the saved desktop configuration. Each saved window configuration is displayed as a rectangle (called a ghost window) that is representative of the size and location of the saved window configuration. Each displayed rectangle preferably contains the title of the actual window for the corresponding program. The TopDesk system allows a user to move the displayed rectangles to modify the saved desktop configuration.

The TopDesk system allows a user to activate a saved desktop configuration. During this activation process, the TopDesk system activates any currently-inactive programs that are associated with a saved window configuration and sets the actual window configuration of the program to the saved window configuration. Thus, a user can persistently save desktop configurations and efficiently activate a desktop configuration.

The TopDesk system preferably displays within its window a representation of the actual window configuration associated with each currently-active program. Each actual window configuration is displayed as a rectangle (called a visible window) that is representative of the size and location of the actual window configuration. To distinguish a ghost window from a visible window, the TopDesk system displays the windows with different attributes (e.g., color). The TopDesk system can display the ghost windows and the visible windows simultaneously.

BRIEF DESCRIPTION OF THE DRAWINGS

FIG. 2A illustrates the logical organization of desktop configurations maintained by a TopDesk system.

FIG. 18 illustrates data structures used by the TopDesk system.

DETAILED DESCRIPTION OF THE INVENTION

The present invention provides a method and system for controlling desktop configurations of windows within a computer system. A TopDesk system, which implements the methods of the present invention, interacts with a windowing system to maintain various desktop configurations upon user selection. Each desktop configuration contains one or more window configurations. The TopDesk system collects from the windowing system the configuration of each window associated with an active program. Each window configuration includes the size and location of the actual window within the desktop along with the title of the actual window. The TopDesk system allows a user to generate various desktop configurations. Upon user request, the TopDesk system effects the display of a desktop configuration by interacting with the windowing system.

Figure 1A:
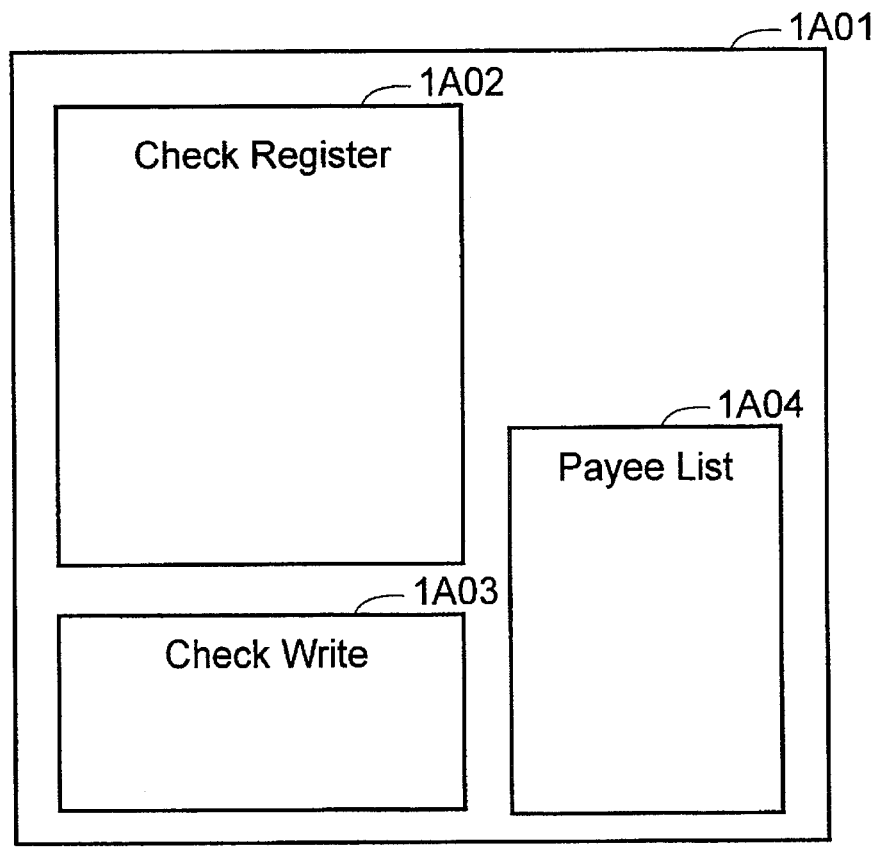
FIG. 1A shows a sample desktop configuration for performing accounts payable tasks.
Figure 1B:
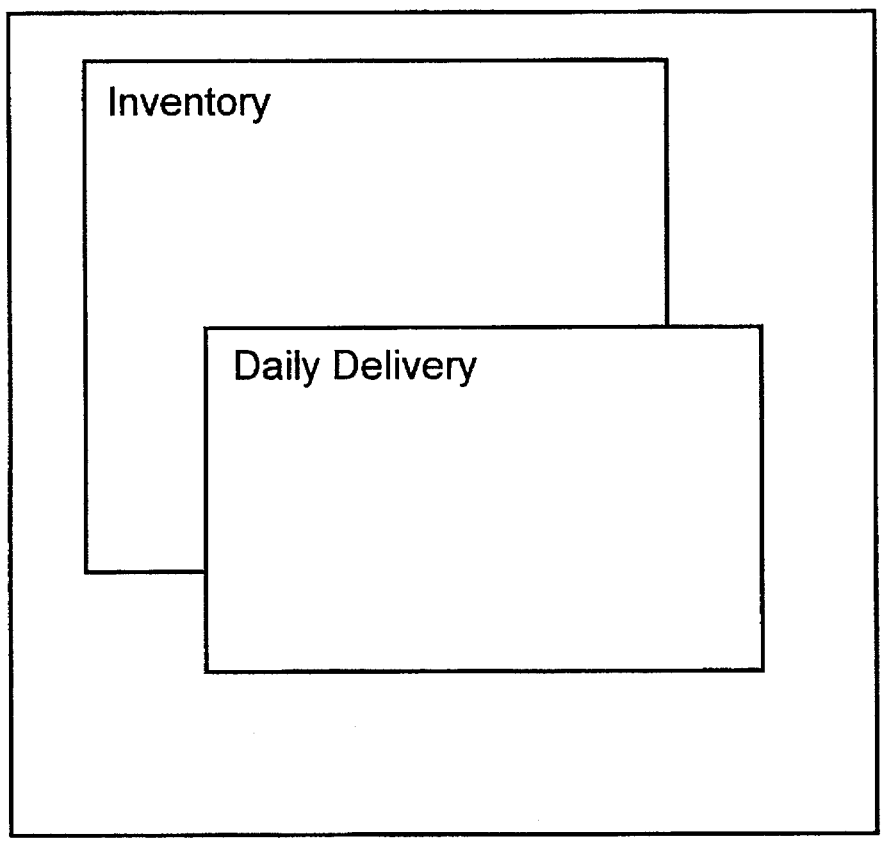
FIG. 1B shows a sample desktop configuration for performing inventory control tasks.
Figure 2B:
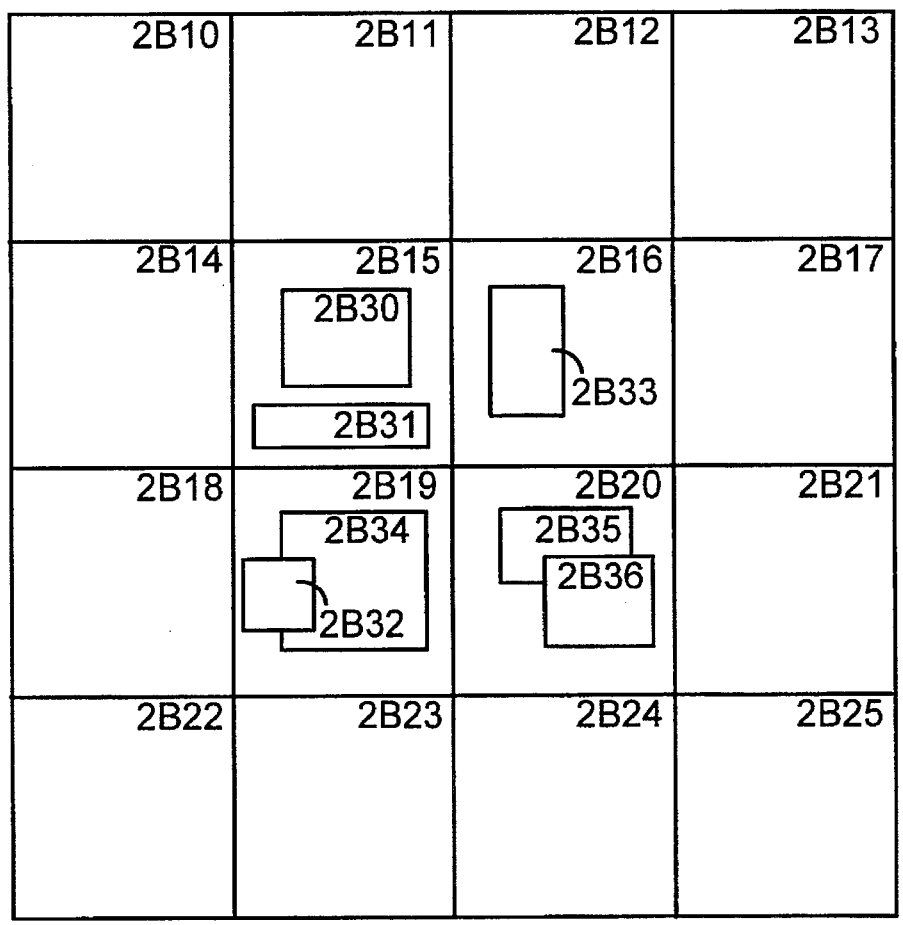
FIG. 2B illustrates the moving of visible windows.

FIG. 2A illustrates the logical organization of desktop configurations maintained by the TopDesk system. The TopDesk system organizes the various desktop configurations into a grid of desktops for display. This grid is referred to as a virtual desktop 2A01. The virtual desktop 2A01 contains desktops 2A10 through 2A25. Each of these desktops contains a desktop configuration. Desktops 2A15, 2A16, 2A19, and 2A20 represent the desktop configurations as an arrangement of rectangles (visible windows) 2A30 through 2A36, each of which is associated with an actual window of an active program. (The term "actual window" refers to a window in which program output is displayed. The term "visible window" refers to a rectangular representation of the configuration of an actual window that is displayed by the TopDesk system. The term "ghost window" refers to a rectangular representation of a persistently saved window configuration.) As shown in FIG. 2A, display 2A02 is currently displaying the desktop configuration of desktop 2A20. The desktop that is currently being displayed is referred to as the current desktop. The TopDesk system allows the user to change the current desktop by clicking with a mouse within the desired desktop when the virtual desktop is displayed. The TopDesk system allows a user to reconfigure the visible windows on the virtual desktop 2A01. For example, a user can click within visible window 2A32 and drag the visible window to desktop 2A19, which would result in the desktop configurations shown in FIG. 2B. When the moving of windows affects the desktop configuration of the current desktop, the TopDesk system directs the windowing system to configure the corresponding actual window in accordance with the new configuration of the moved visible window.

Figure 3A:
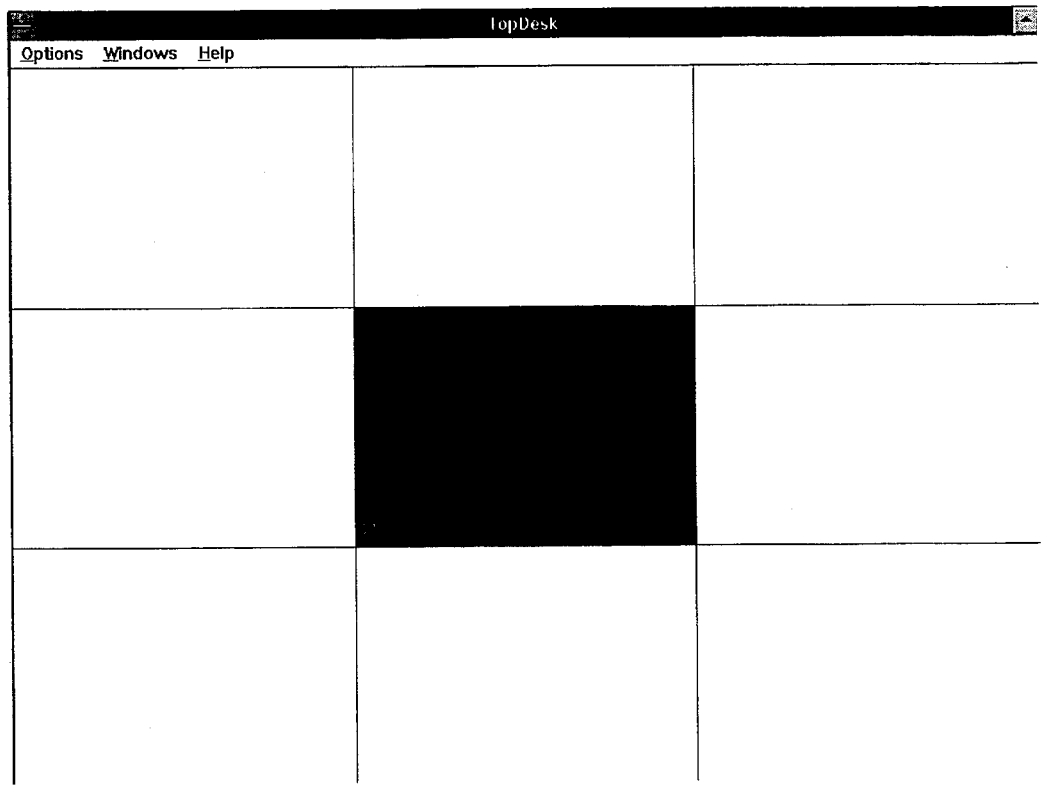
FIGS. 3A and 3B illustrate a sample display of the virtual desktop.
Figure 3B:
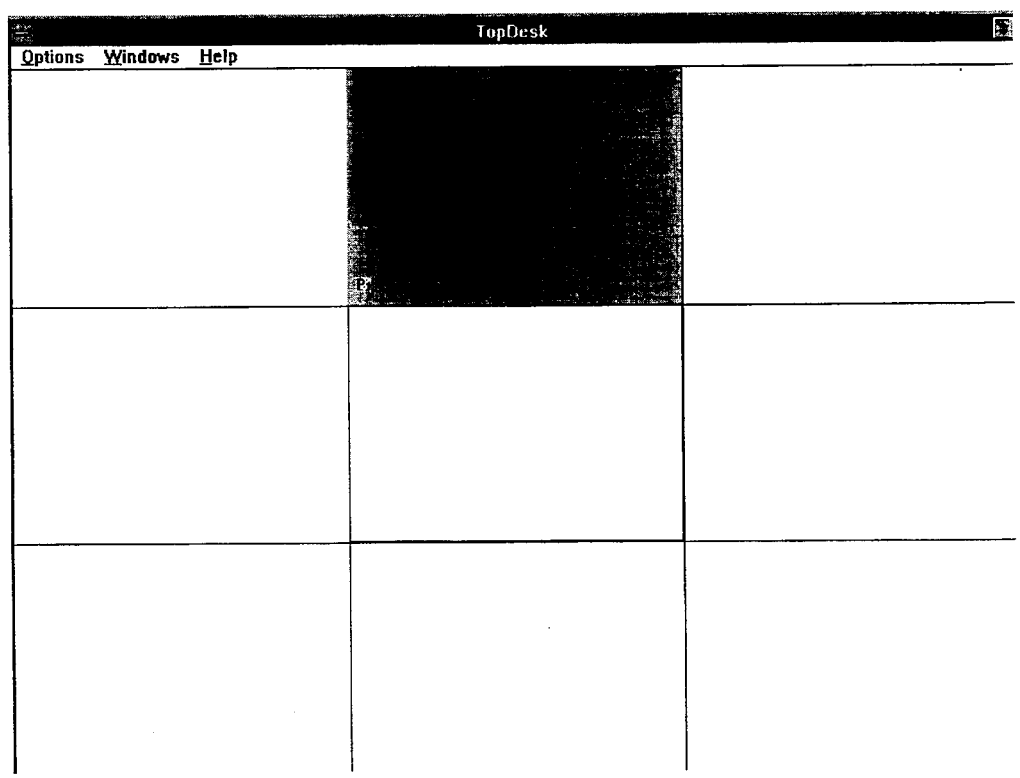

FIGS. 3A and 3B illustrate a sample display of the virtual desktop. The TopDesk system displays the virtual desktop as a 3×3 grid of desktops. In a preferred embodiment, a user can specify the size of the grid (e.g., 4×5). None of the desktops contain window configurations. The shaded desktop indicates that it is the current desktop. The symbol in the lower left corner indicates that the current desktop contains one minimized window. FIG. 3B illustrates a change in the current window. In a preferred embodiment, the TopDesk system allows a user to switch to a new current desktop by either using the arrow keys or clicking with a right mouse button within a desktop.

Figure 4:
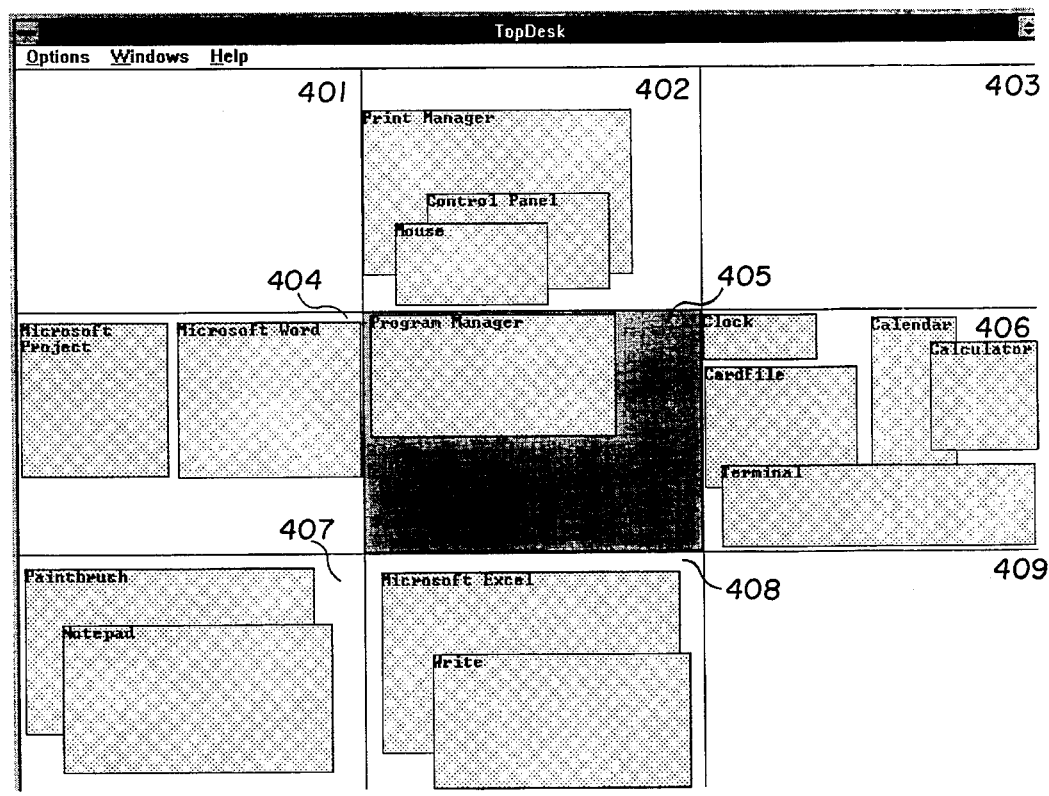
FIG. 4 illustrates a sample display of a virtual desktop with multiple desktop configurations.
Figure 5A:
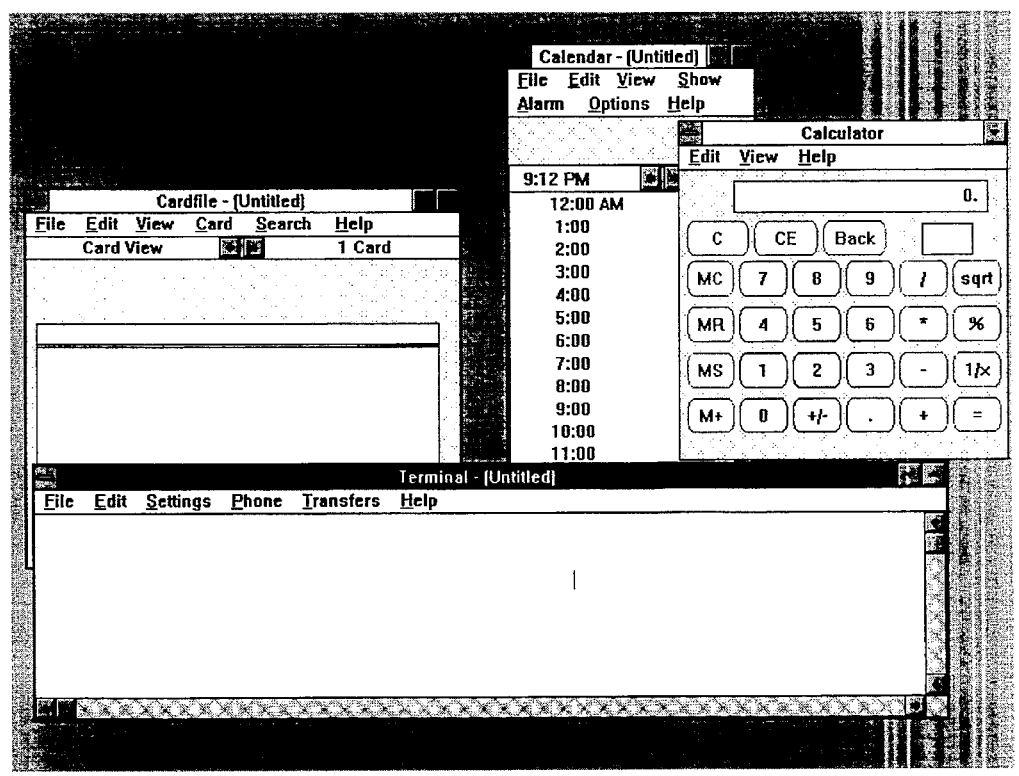
FIG. 5A shows the display device when the user selects a certain desktop as the current desktop.
Figure 5B:
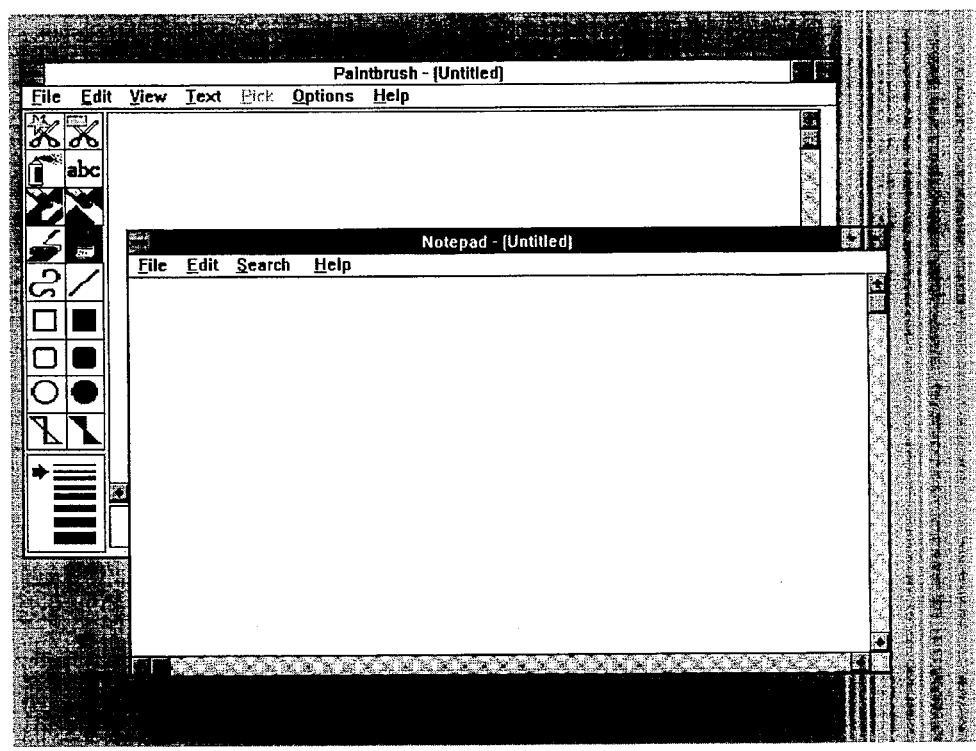
FIG. 5B illustrates the display device when the user selects another desktop as the current desktop.

FIG. 4 illustrates display of a virtual desktop with multiple desktop configurations. Desktops 402, 404, 405, 406, 407, and 408 contain desktop configurations. Each of the visible windows, shown in checkerboard pattern, contains the title of the associated window. FIG. 5A shows the display device when the user selects desktop 406 as the current desktop. The title of each actual window in FIG. 5A corresponds to the name shown in the visible windows of desktop 406. FIG. 5B illustrates the display device when the user selects desktop 407 as a current desktop.

The TopDesk system provides the facility to save the desktop configurations of the virtual desktop. The user can then modify the desktop configurations by moving the visible windows. At a later time, the TopDesk system, in response to a user command, can revert to the saved desktop configurations.

Figure 6:
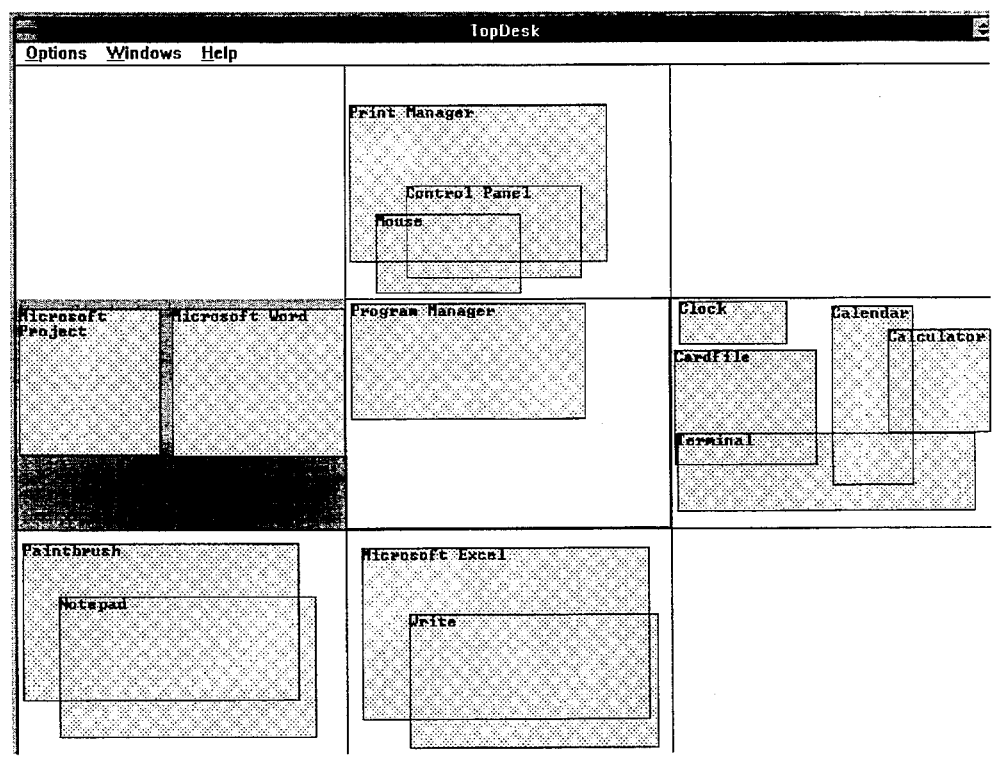
FIG. 6 illustrates the virtual desktop after a snapshot is taken.

The process of saving the desktop configurations is referred to as taking a snapshot. FIG. 6 illustrates the virtual desktop after a snapshot is taken. Each visible window is displayed along with a ghost window. The ghost windows coincide with the configuration of each visible window immediately after a snapshot is taken. Each ghost window is represented by a rectangle. As shown in FIG. 6, each overlapped visible window is shown with the rectangle around it representing the ghost window.

Figure 7:
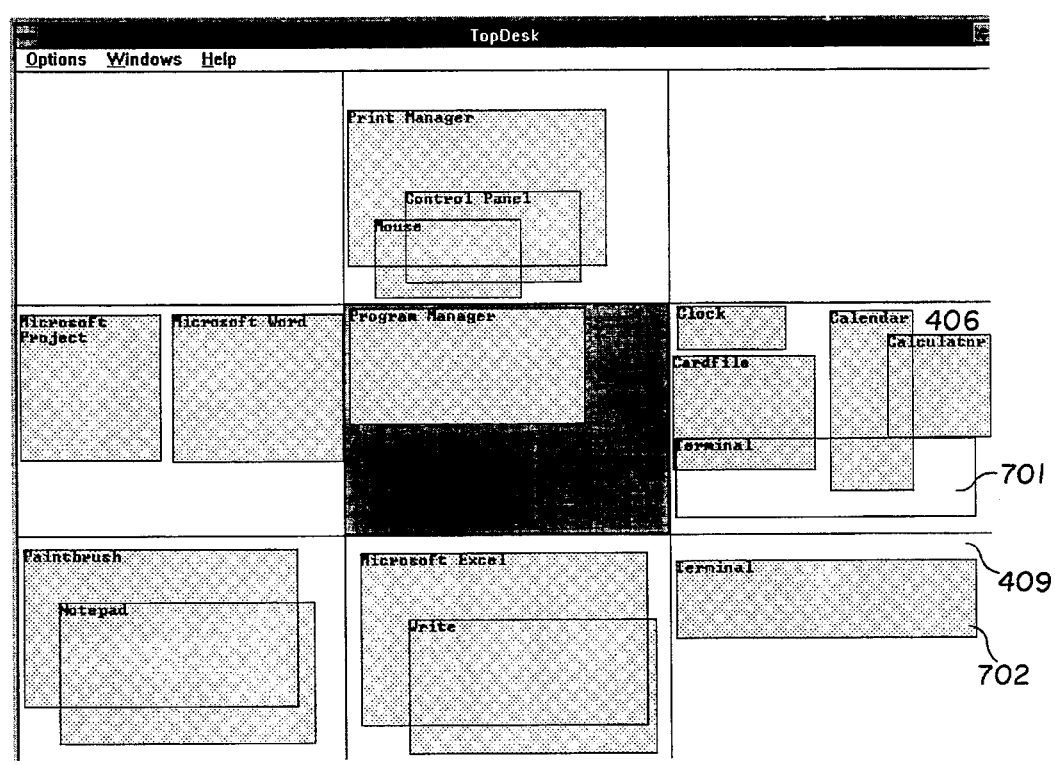
FIG. 7 illustrates a ghost window.

FIG. 7 illustrates a ghost window. When a snapshot was taken, the ghost window 701 was created for visible window 702. The visible window 702 has been moved to a different desktop. However, the ghost window 701 remains at the location of the visible window at the time of the snapshot. If the user were to select desktop 409 as the current desktop, then the user would see an actual window of the Terminal program displayed on the display device. However, if the user were to select desktop 406 as a current desktop, the user would not see an actual window for the Terminal program. The ghost window 701 is a visual indication of the configuration of the visible window 702 when the snapshot was taken. Ghost window 701 corresponds to visible window 702.

Figure 8:
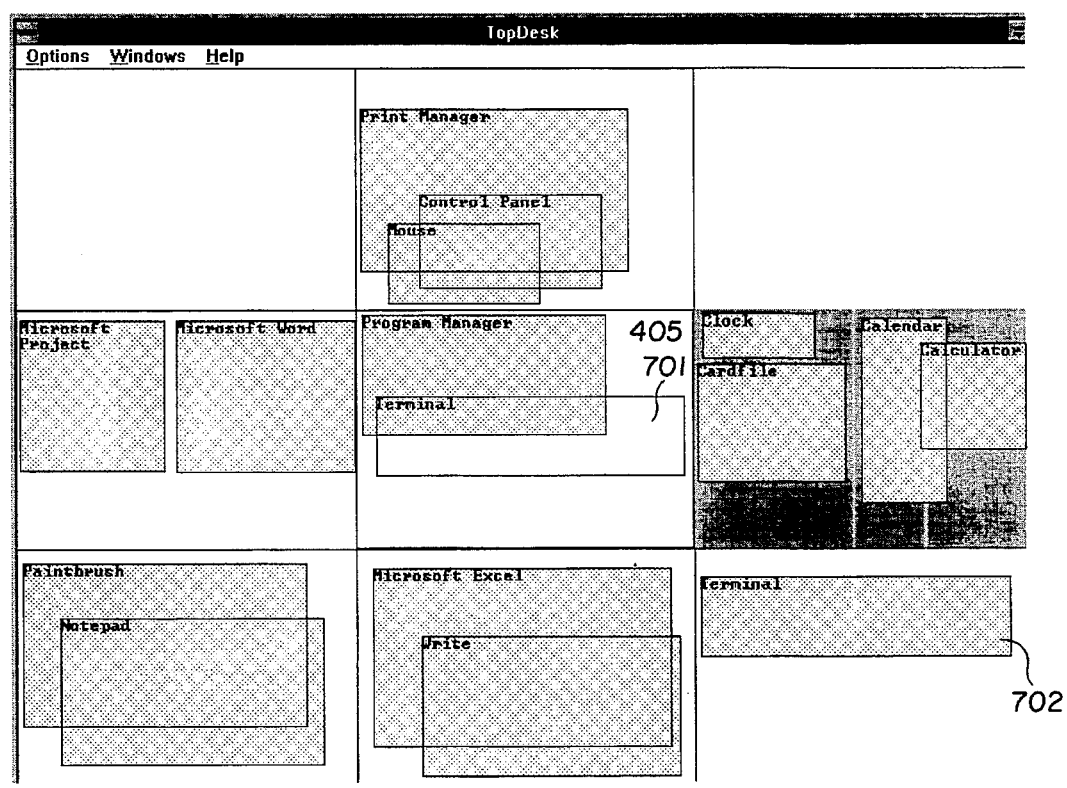
FIG. 8 illustrates movement of a ghost window.

FIG. 8 illustrates movement of a ghost window. In a preferred embodiment, the TopDesk system allows the user to move a ghost window. Ghost window 701 has been moved to desktop 405. A ghost window, like a visible window, can be moved by clicking within the ghost window with the left mouse button and dragging the ghost window to the new location. The movement of a ghost window changes the saved desktop configurations.

Figure 9:
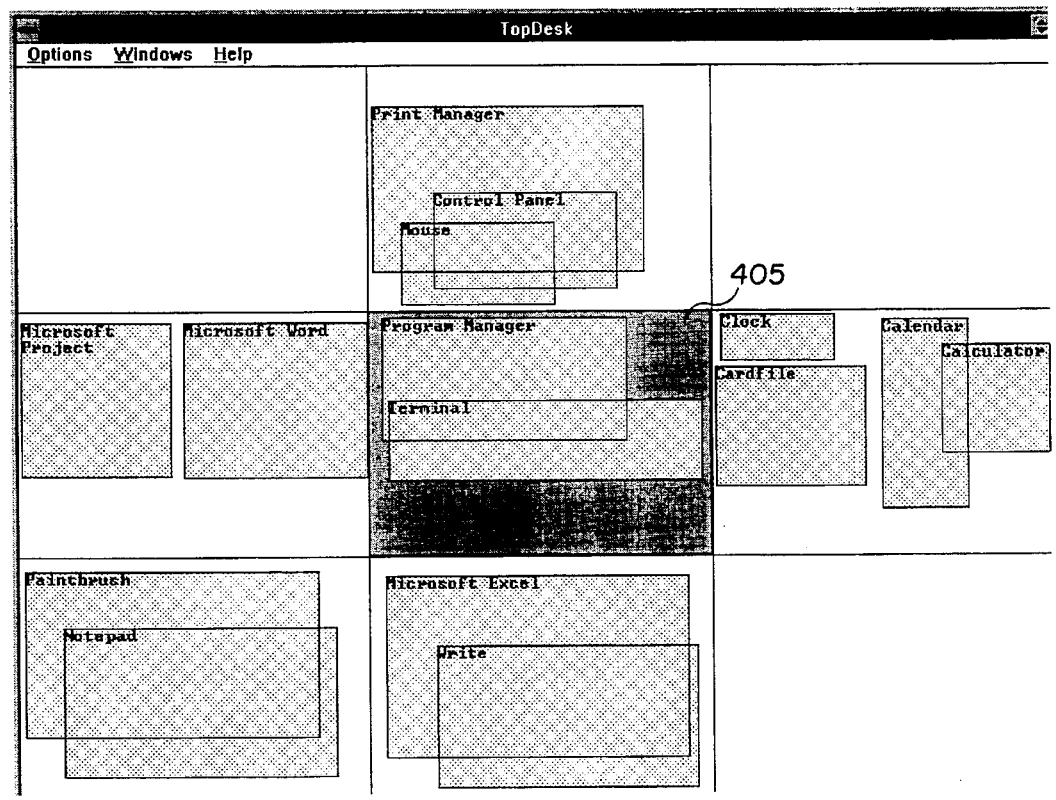
FIG. 9 illustrates the arranging of visible windows to coincide with the corresponding ghost window.

FIG. 9 illustrates the arranging of visible windows to coincide with the corresponding ghost window. When a user selects the arrange option, the TopDesk system moves each visible window to coincide with the location and size of its corresponding ghost window, if one exists. In the example of FIG. 8, when the user selects the arrange option, the TopDesk system moves the visible window 702 to coincide with the ghost window 701. When desktop 405 is displayed, the actual window of the terminal program is set to the configuration of visible window 702.

Figure 10:
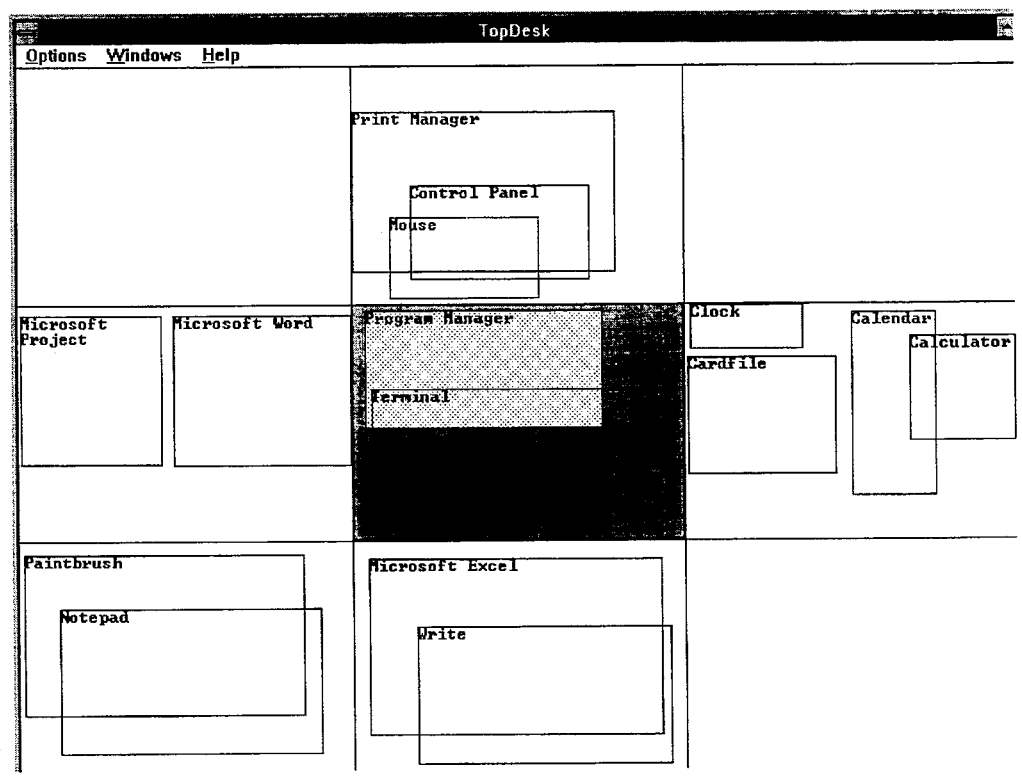
FIG. 10 illustrates the virtual desktop after each program, except the Program Manager program, has been inactivated.

FIG. 10 illustrates the virtual desktop after each program, except the Program Manager program, has been inactivated. The virtual desktop shows the ghost windows and the visible window for the only active application, the Program Manager program. The TopDesk system persistently stores the size, location, and associated window title of each ghost window.

Figure 11:
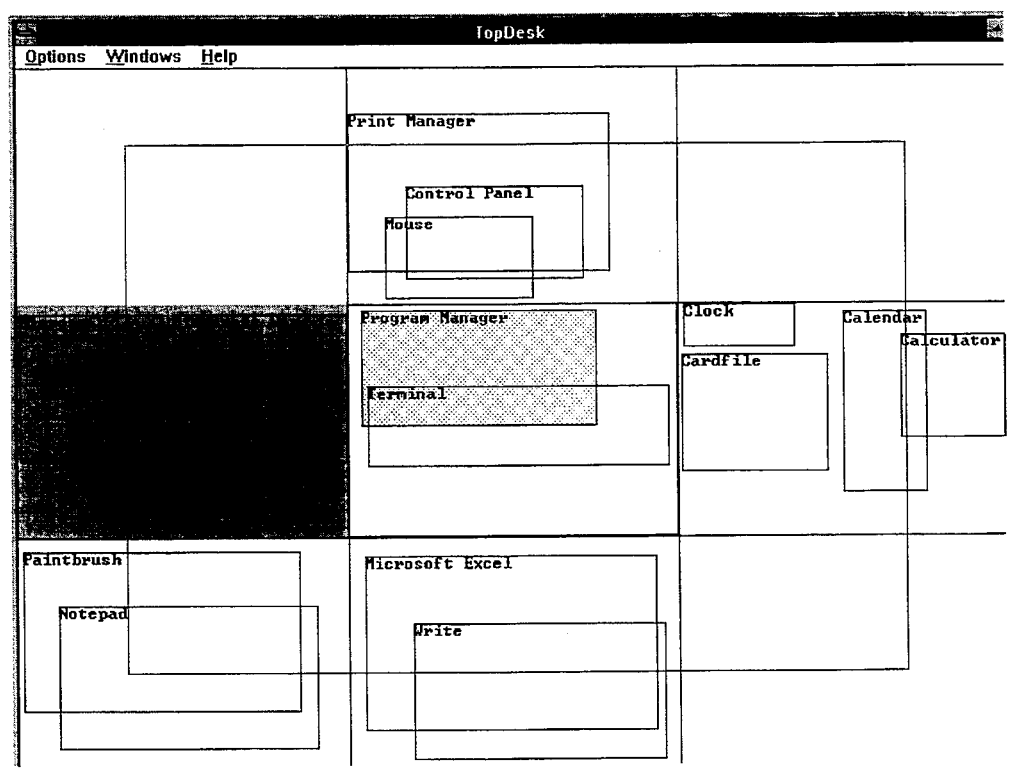
FIG. 11 illustrates activating each application program associated with a ghost window.
Figure 12:
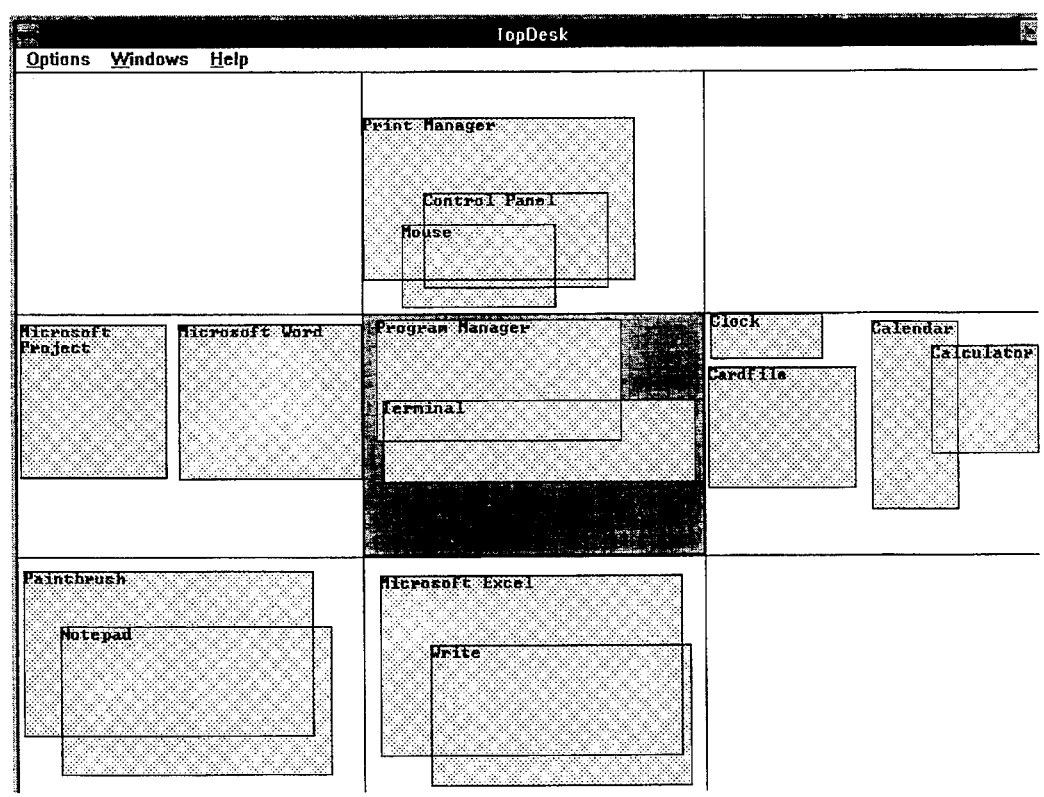
FIG. 12 illustrates the virtual desktop after all applications have been activated.

FIG. 11 illustrates activating each application program associated with a ghost window. The TopDesk system allows the user to draw a rectangle on the virtual desktop. The TopDesk system then activates the programs for each ghost window that is within the user drawn rectangle. FIG. 12 illustrates the virtual desktop after all applications have been activated. Each visible window coincides with the corresponding ghost window.

Figure 13:
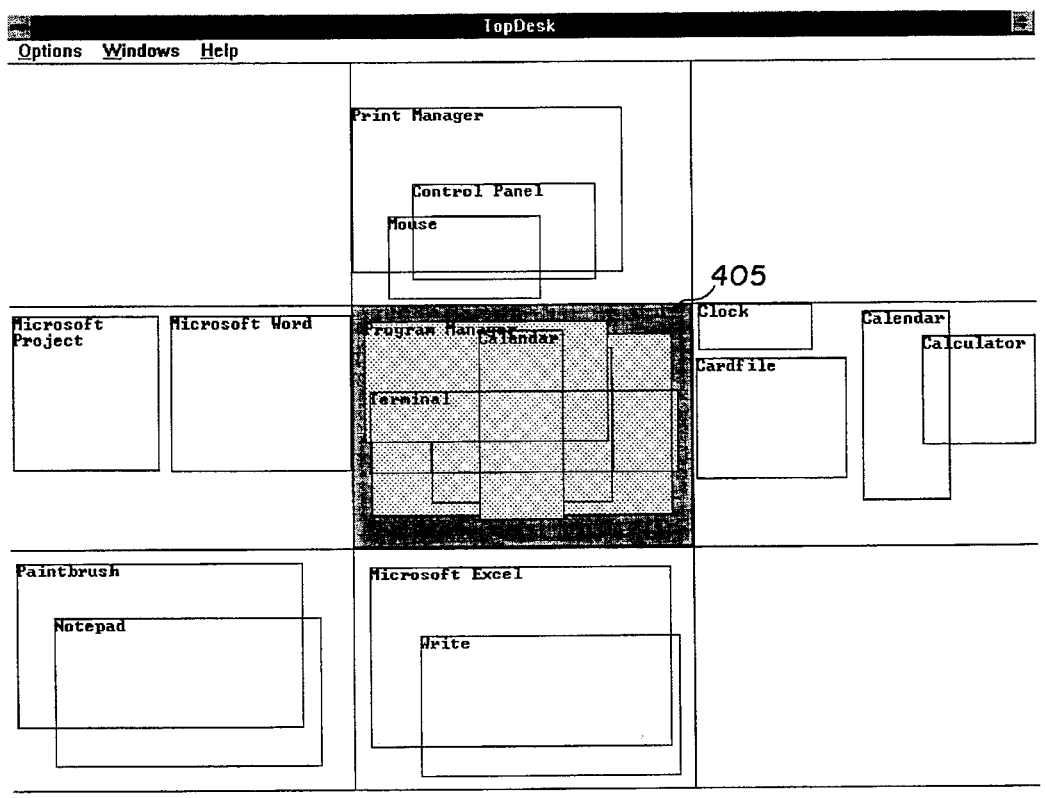
FIG. 13 illustrates gathering of all visible windows into one desktop.

FIG. 13 illustrates gathering of all visible windows into one desktop. When a user selects the gather option, the TopDesk system moves each visible window to a desktop designated as the home desktop. Each of the visible windows is shown centered within the home desktop 405.

Figure 14:
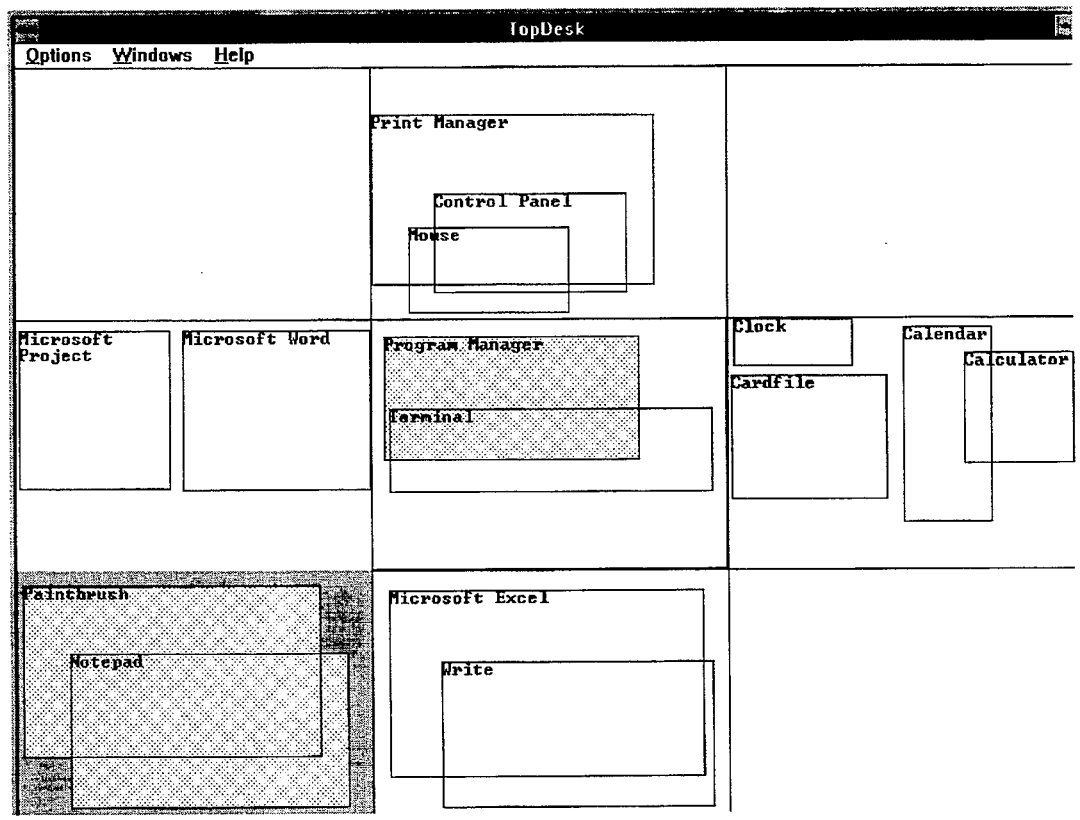
FIG. 14 illustrates the virtual desktop when only the Paintbrush program, the Notepad program, and the Program Manager program are active.

FIG. 14 illustrates the virtual desktop when only the Paintbrush program, the Notepad program, and the Program Manager program are activated. The TopDesk system activates a program when the user clicks with the right mouse button on a ghost window. The TopDesk system directs the windowing system to activate the program and to configure the actual window in accordance with the configuration of the ghost window. The visible window for the activated program thus coincides with the ghost window. If the program is already active, the TopDesk system directs the windowing system to configure the actual window in accordance with the configuration of the ghost window.

Figure 15:
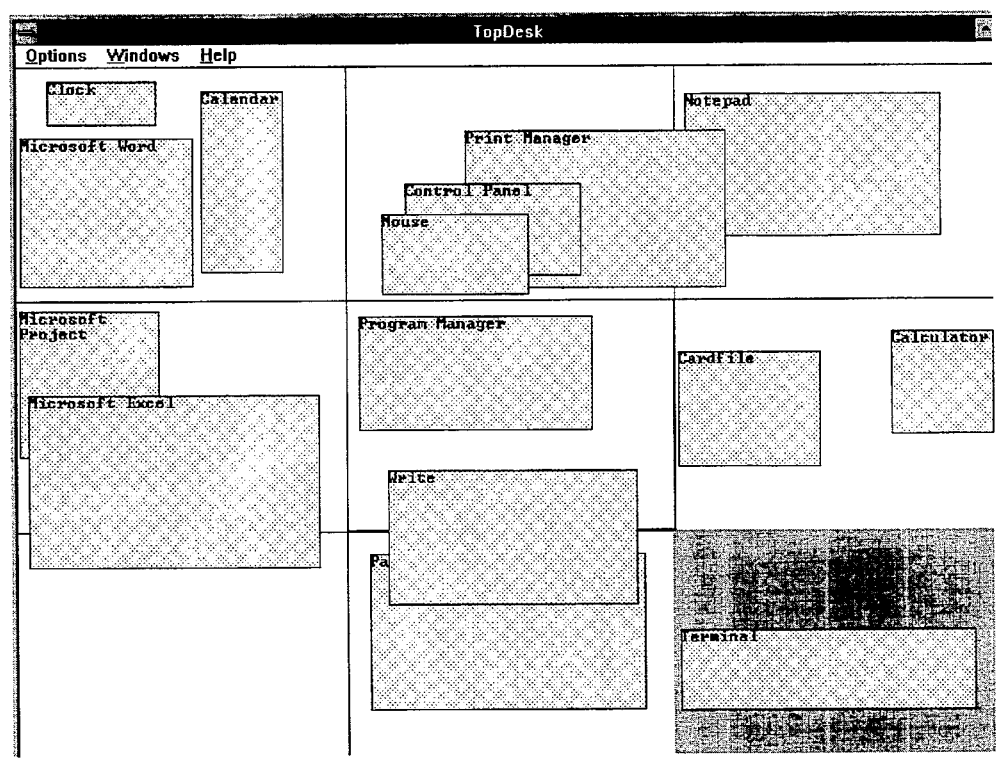
FIG. 15 illustrates an alternate arrangement of windows of the virtual desktop.

FIG. 15 illustrates an alternate arrangement of windows of the virtual desktop. In a preferred embodiment, the TopDesk system allows the user to move a window by clicking the left button down and dragging the window. As illustrated in FIG. 15, a window can cross desktop boundaries.

Figure 16:
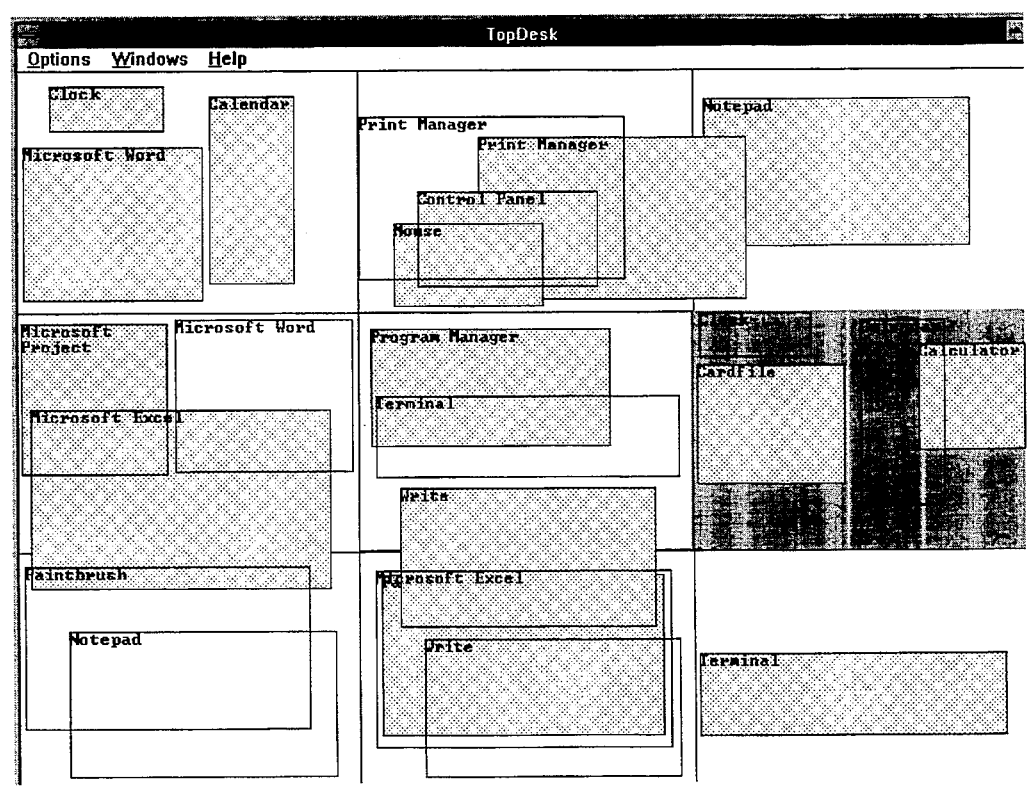
FIG. 16 illustrates the arrangement of FIG. 15 with corresponding ghost windows.

FIG. 16 illustrates the arrangement of FIG. 15 with corresponding ghost windows. The user could use the arrange option to set each visible window to coincide with its corresponding ghost window.

Figure 17:
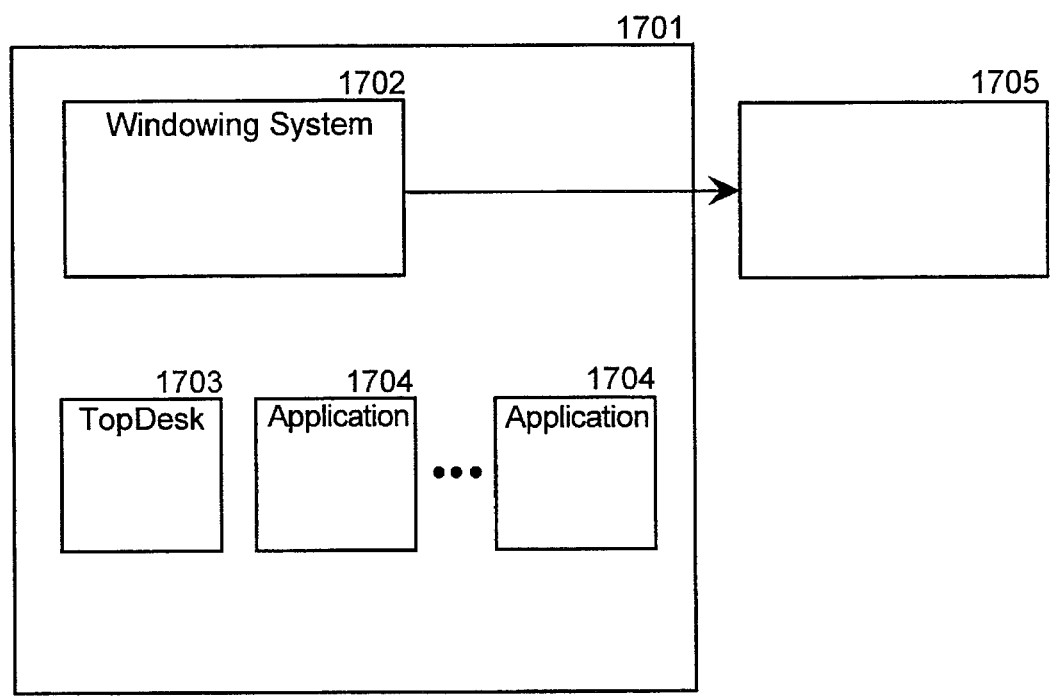
FIG. 17 is a block diagram of a computer system implementing the present invention.

FIG. 17 is a block diagram of a computer system implementing the present invention. The computer system 1701 comprises a central processing unit, a computer memory, and input/output devices, such as a mouse and a display device. The computer system executes a windowing system 1702, which controls the interface with the display device 1705. The windowing system 1702 interfaces with programs 1704 and the TopDesk system to output data to display 1705. In a preferred embodiment, the TopDesk system 1703 executes as any other application program by the windowing system.

FIG. 18 illustrates data structures used by the TopDesk system. The TopDesk system maintains a Visible Window Table 1810 (VWT), a Ghost Window Table (GWT) 1820, and an Executable Table 1830. The Visible Window Table 1810 contains an entry for each visible window in the virtual desktop. Each entry contains the fields: Title, Handle, Location, MinMax, and Ghost. The Title field contains the title of the visible window, which corresponds to the title in the title bar of an actual window. The Handle field contains the handle that identifies the actual window to the windowing system. The Location field contains the size and location of the visible window. The MinMax field indicates whether the actual window is minimized, normal size, or maximized. The Ghost field points to an entry in the Ghost Window Table when the visible window has a corresponding ghost window. The Ghost Window Table 1820 contains an entry for each ghost window designated when the last snapshot was taken. Each entry contains the fields: Title and Location. The Title field contains the title from the title bar when a snapshot was taken. The Location field contains the size and location of the ghost window. The Executable Table 1830 contains an entry for various window titles. Each entry contains the fields: Title and FileName. The Title field contains the title of the window. The FileName field contains the name of the file that contains the executable code for the program code associated with the title.

Figure 19:
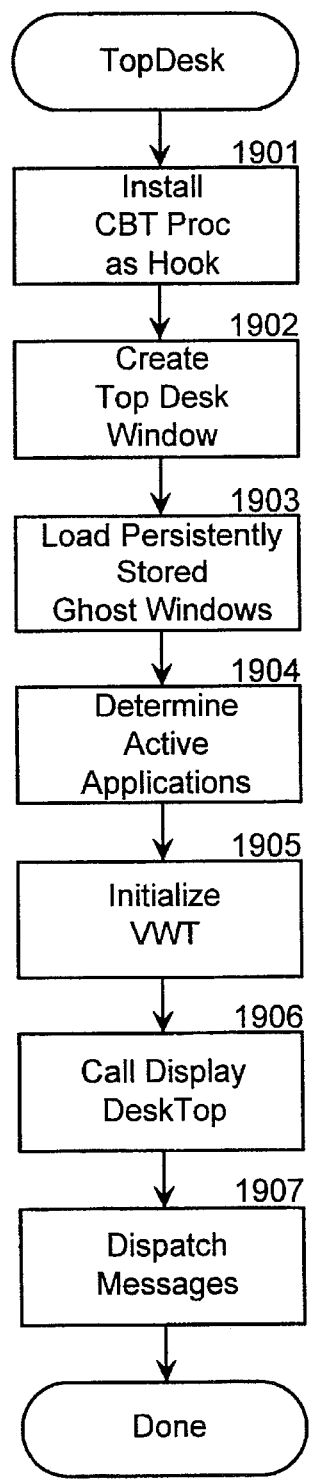
FIG. 19 is an overview flow diagram of the TopDesk system.

FIG. 19 is an overview flow diagram of the TopDesk system. The TopDesk system monitors the windowing system to determine when an actual window is created, destroyed, or moved. The TopDesk system adjusts its virtual desktop accordingly. In a preferred embodiment, the TopDesk system interfaces with the Windows windowing system as described in "Programming Windows 3.1," by Charles Petzold and published by Microsoft Press, which is hereby incorporated by reference. In step 1901, the TopDesk system installs a procedure as a hook within the windowing system. Whenever the windowing system activates, creates, destroys, moves or sizes, and minimizes or maximizes a window (a window event), the windowing system notifies the TopDesk system through this hook. In step 1902, the TopDesk system creates a TopDesk window. The TopDesk system displays the virtual desktop within the TopDesk window. In step 1903, the TopDesk system loads any persistently stored ghost window information. This information is loaded into the Ghost Window Table. In step 1904, the TopDesk system determines if there are any currently-active programs. In step 1905, the TopDesk system initializes the Visible Window Table with an entry for each active program. The TopDesk system sets the Location field of these entries to the size and location of a corresponding ghost window, if one exists. In step 1906, the TopDesk system invokes the function DisplayDeskTop which displays the virtual desktop within the TopDesk window and displays the current desktop on the display device. In step 1907, the TopDesk system loops dispatching messages until an indication is received to inactivate the TopDesk system. When the indication is received, the TopDesk system uninstalls the CBTProc hook and terminates.

Figure 20:
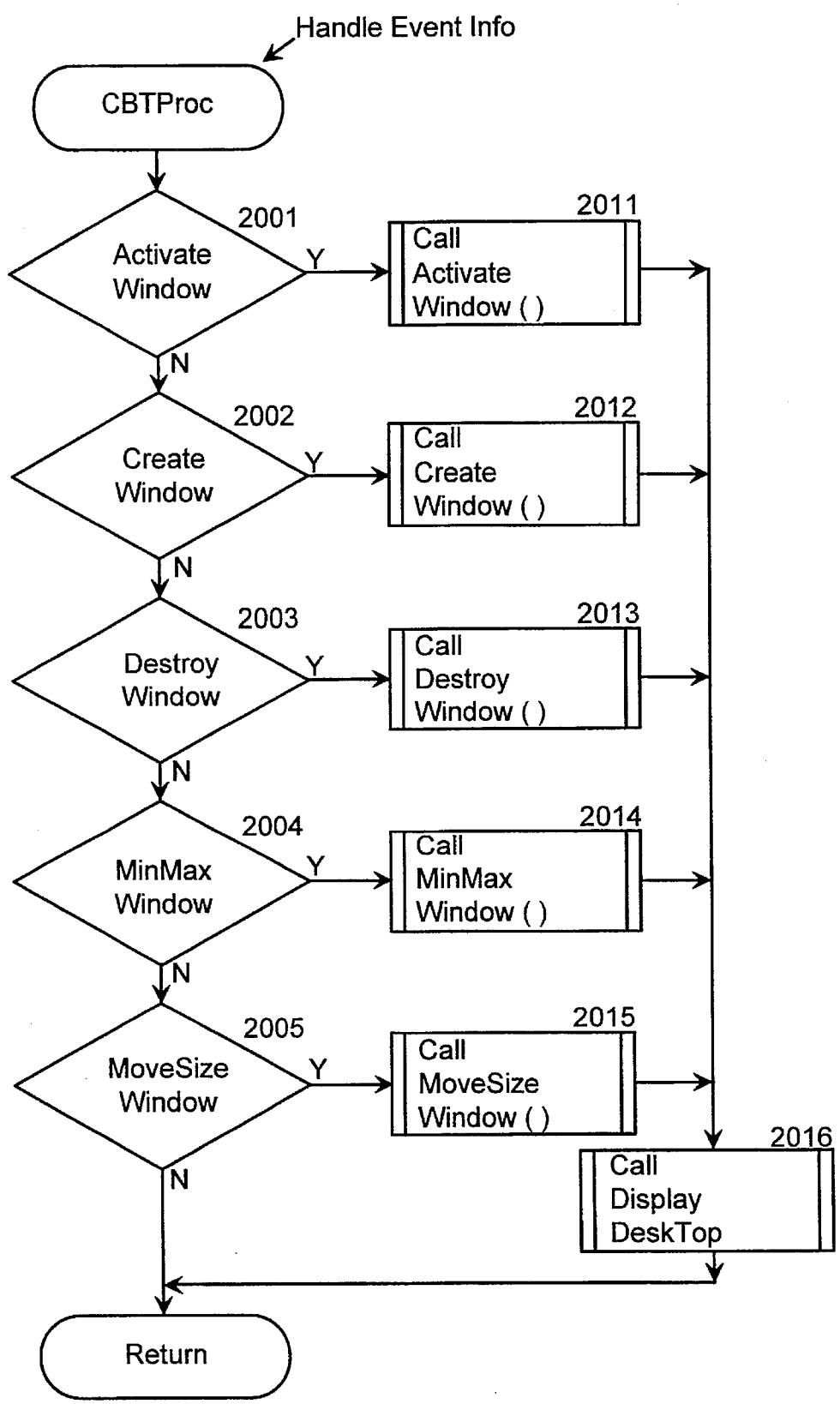
FIG. 20 is a flow diagram of the procedure CBTProc.

FIGS. 20 through 25 are flow diagrams of the hook procedure that is invoked by the windowing system to handle window events. FIG. 20 is a flow diagram of the procedure CBTProc. The windowing system invokes the procedure CBTProc to handle a window event when each event occurs. The procedure is passed a handle to the actual window to which the event is directed and event information. The event information indicates, for example, the new location of a moved window. The procedure CBTProc updates the Visible Window Table to reflect the new state of the virtual desktop. In steps 2001 through 2005, the procedure determines which window event occurred. The window events of interest are ActivateWindow, CreateWindow, DestroyWindow, MinMaxWindow, and MoveSizeWindow. In steps 2011 through 2015, the procedure invokes a function to process each window event. After each function returns, the procedure invokes function DisplayDeskTop in step 2016. The procedure then returns. Each of the invoked functions are described below in detail.

Figure 21:
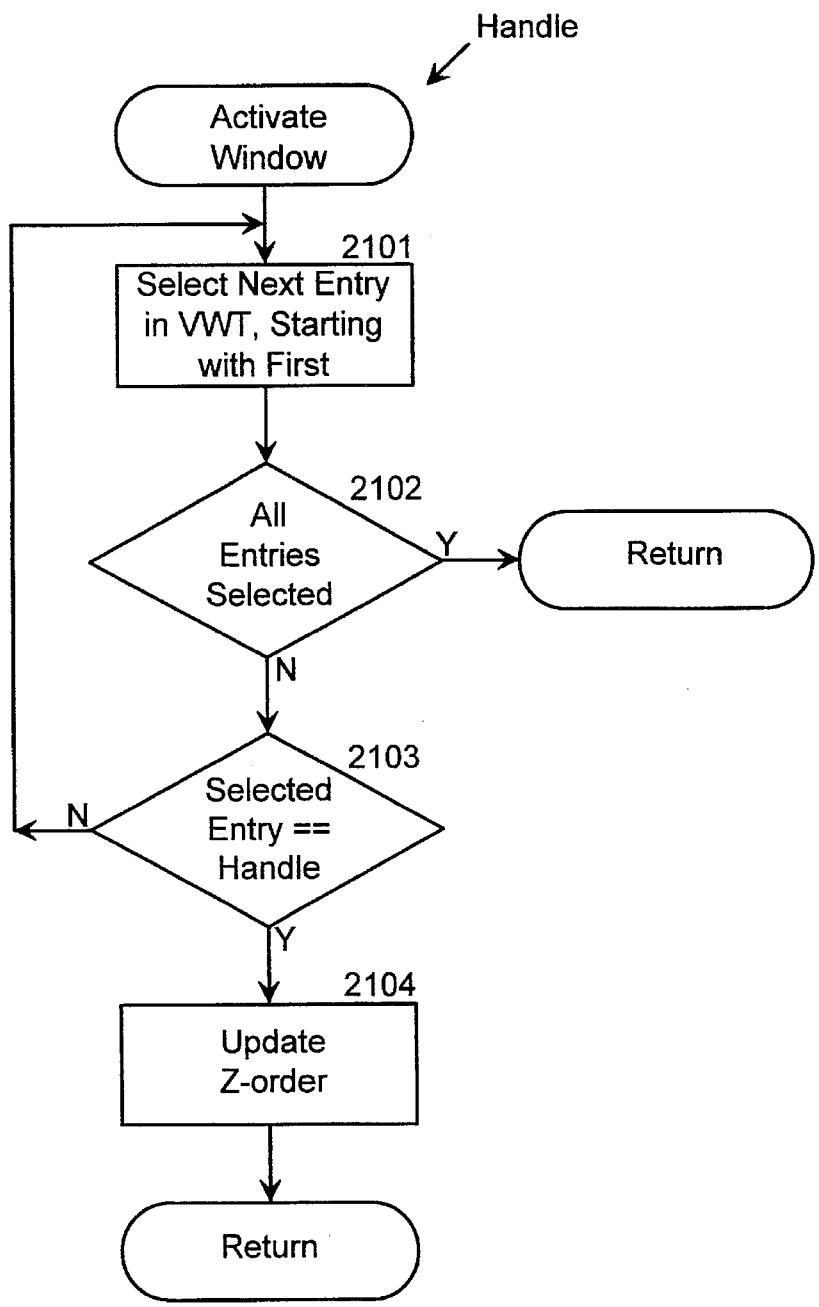
FIG. 21 is a flow diagram of the function ActivateWindow.

FIG. 21 is a flow diagram of the function ActivateWindow. This function locates an entry in the Visible Window Table corresponding to the actual window that was just activated and updates the Z-order for that window. This function is passed the handle of the actual window just activated. As is well known in the art, the Z-order refers to overlapping order of windows. Also, well known in the art are techniques for representing the Z-order of windows (e.g., maintaining the entries in the Visible Window Table as sorted in Z-order). In steps 2101 through 2103, the function loops until it locates an entry in the Visible Window Table corresponding to the passed handle. In step 2101, the function selects the next entry in the Visible Window Table starting with the first entry. In step 2102, if all the entries have already been selected, then the function returns, else the function continues at step 2103. In step 2103, if the handle of the selected entry equals the passed handle, then the function continues at step 2104, else the function loops to step 2101 to select the next entry. In step 2104, the function updates the Z-order so that the visible window corresponding to the activated window is now the topmost visible window.

Figure 22:
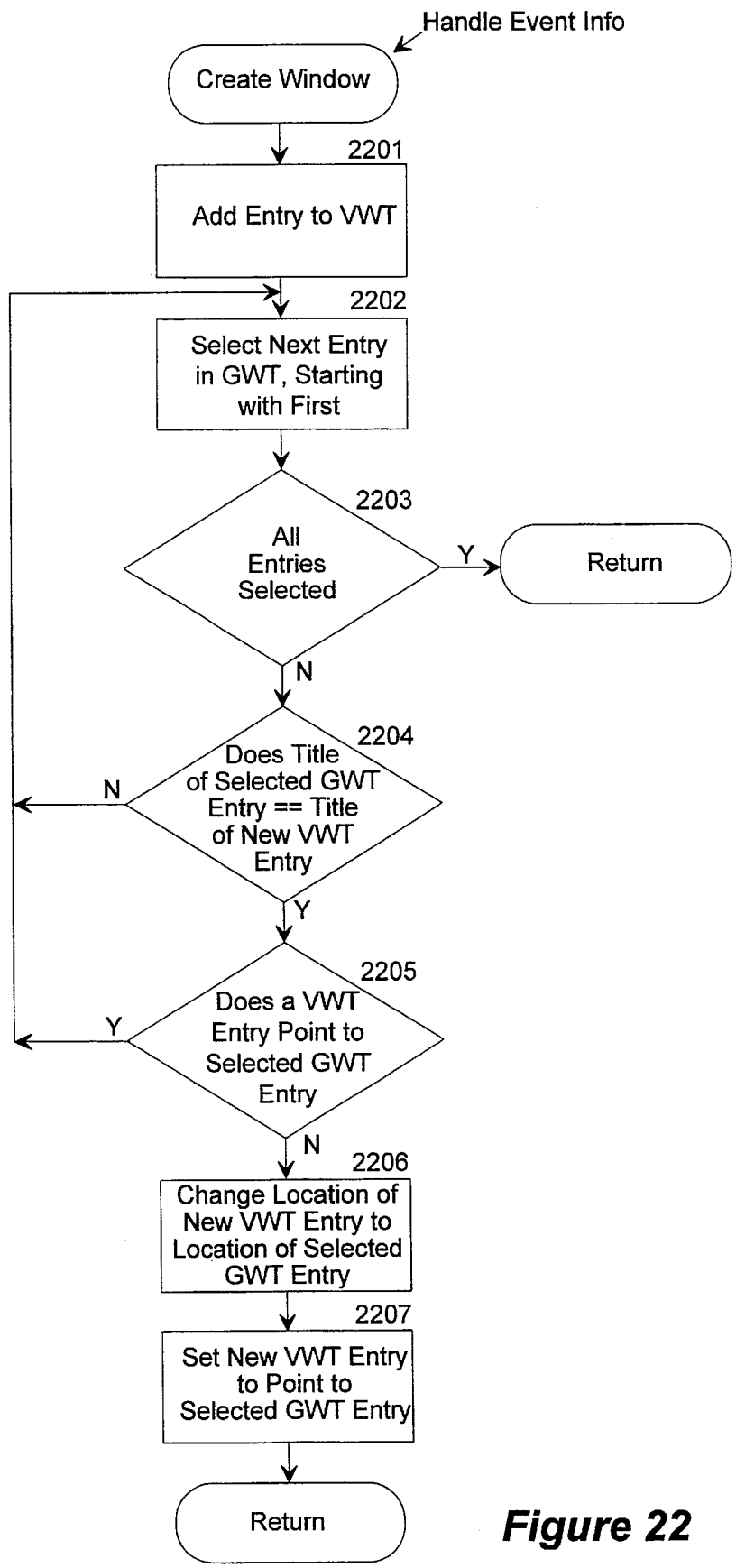
FIG. 22 is a flow diagram of the function CreateWindow.

FIG. 22 is a flow diagram of the function CreateWindow. The function CreateWindow is passed the handle to an actual window that is being created and event information about that window. The function CreateWindow adds an entry to the Visible Window Table. In step 2201, the function adds an entry to the Visible Window Table indicating the size and location passed in the event information. In steps 2202 through 2205, the function loops determining whether there is an entry in the Ghost Window Table with the same title as that of the newly created window that is not already pointed to by an entry in the Virtual Window Table. In other words, the function determines whether there is a ghost window with the same title and with no corresponding visible window. If such a ghost window exists, the function overrides the size and location information stored in the new entry. In step 2202, the function selects the next entry in the Ghost Window Table starting with the first entry. In step 2203, if all entries in the Ghost Window Table have already been selected, then the function returns, else the function continues at step 2204. In step 2204, if the title of the selected Ghost Window Table entry equals the title of the newly created window, then the function continues it step 2205, else the function loops to step 2202 to select the next entry. In step 2205, if a Visible Window Table entry points to the selected Ghost Window Table entry, then the function loops to step 2202 to select the next entry in the Ghost Window Table, else the function continues at step 2206. In step 2206, the function changes the size and location of the new Visible Window Table entry to coincide with that of the selected Ghost Window Table entry. In step 2207, the function sets the new Visible Window Table entry to point to the selected Ghost Window Table entry and returns.

Figure 23:
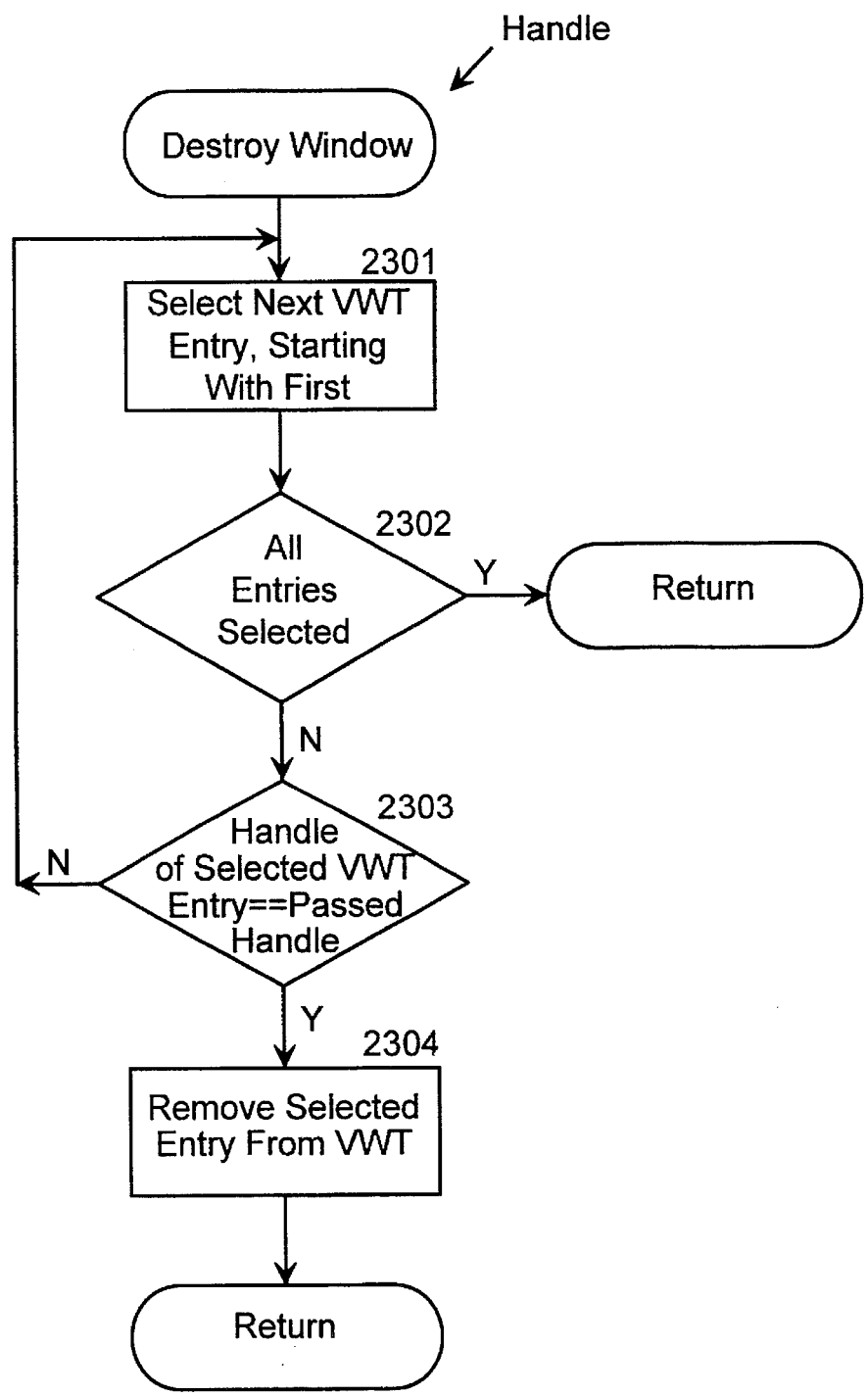
FIG. 23 is a flow diagram of the function DestroyWindow.

FIG. 23 is a flow diagram of the function DestroyWindow. The function DestroyWindow is passed a handle to an actual window and removes the entry from the Visible Window Table corresponding to that handle. In steps 2301 through 2303, the function loops searching for an entry in the Visible Window Table with a handle equal to the passed handle. In step 2301, the function selects the next entry in the Visible Window Table starting with the first entry. In step 2302, if all the entries in the Visible Window Table have been selected, then the function returns, else the function continues at step 2303. In step 2303, if the handle of the selected Visible Window Table entry is equal to the passed handle, then the function continues at step 2304, else the function loops to step 2301 to select the next Visible Window Table entry. In step 2304, the function removes the selected entry from the Visible Window Table and returns.

Figure 24:
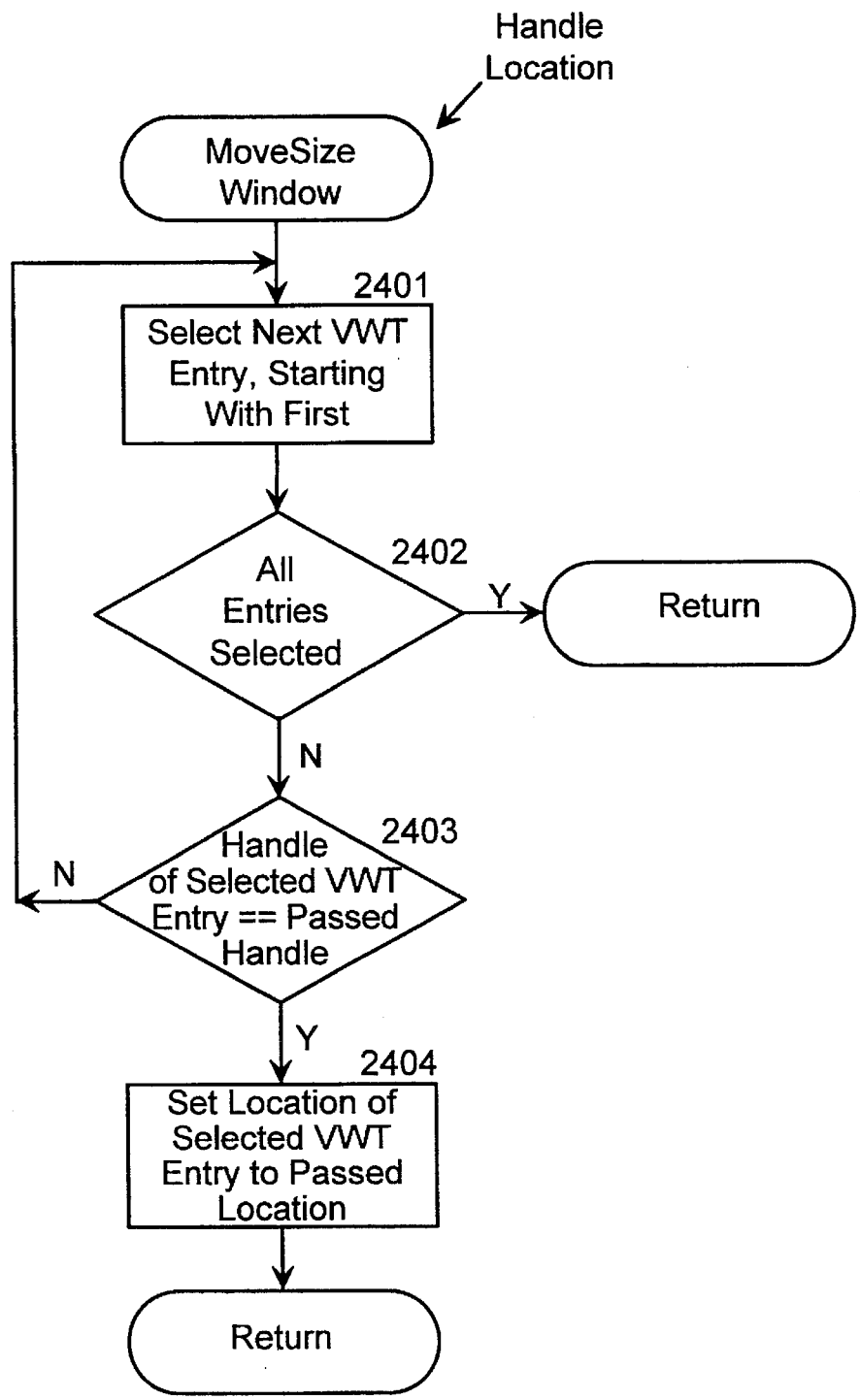
FIG. 24 is a flow diagram of the function MoveSizeWindow.

FIG. 24 is a flow diagram of the function MoveSizeWindow. The function MoveSizeWindow changes the size and location of the visible window corresponding to the passed handle to the passed size and location. In steps 2401 through 2403, the function loops searching for the Visible Window Table entry with a handle equal to the passed handle. In step 2401, the function selects next Visible Window Table entry starting with the first entry. In step 2402, if all entries in the Visible Window Table have already been selected, then the function returns, else the function continues at step 2403. In step 2403, if the handle of the selected Visible Window Table entry equals the passed handle, then the function continues at step 2404, else the function loops to step 2401 to select the next Visible Window Table entry. In step 2404, the function sets the size and location of the selected Visible Window Table entry to the passed size and location and returns.

Figure 25:
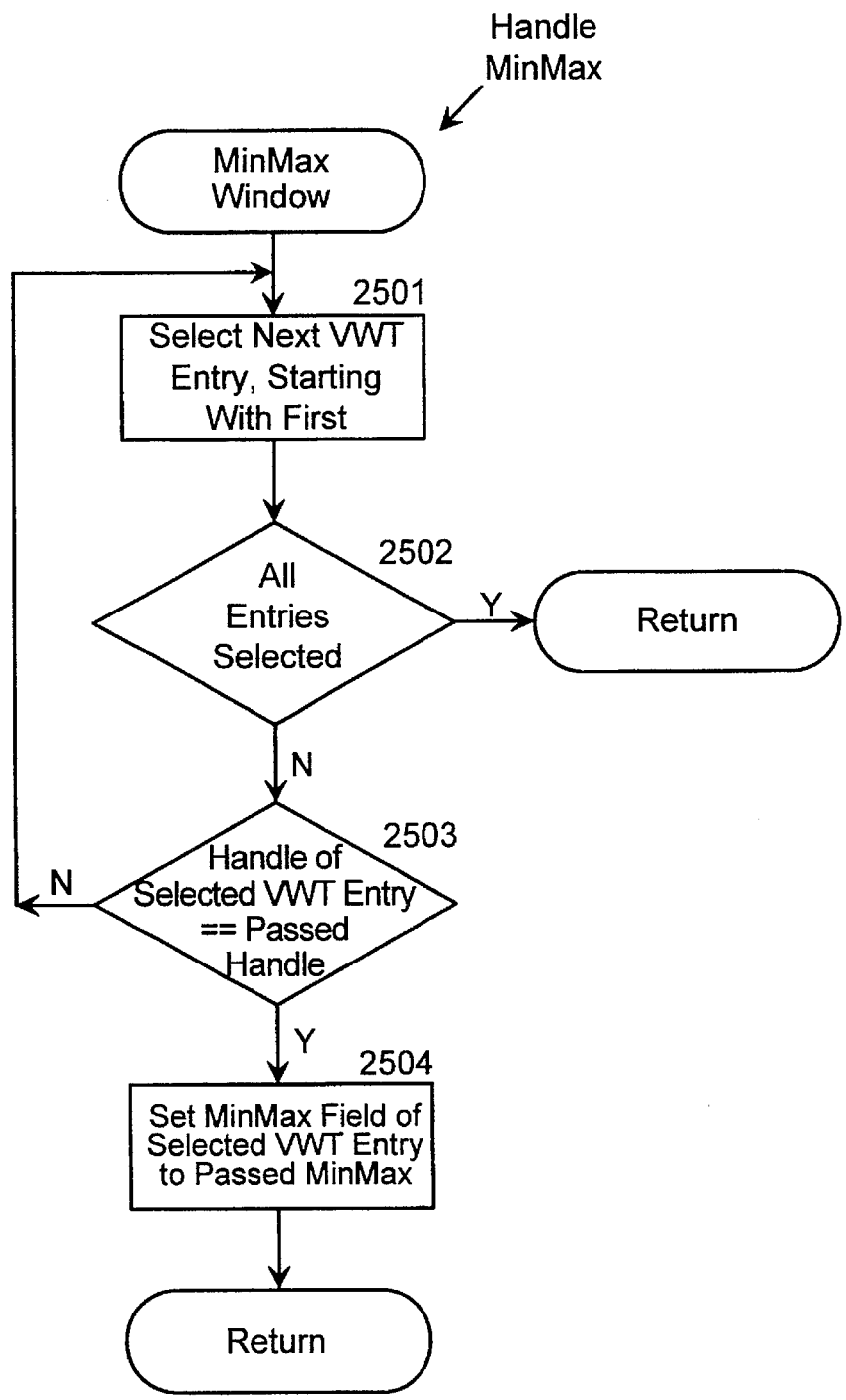
FIG. 25 is a flow diagram of the function MinMaxWindow.

FIG. 25 is a flow diagram of the function MinMaxWindow. The function MinMaxWindow is passed a window handle and a new MinMax value. The function updates the MinMax information for the corresponding visible window. In steps 2501 through 2503, the function loops searching for a Visible Window Table entry with a handle equal to the passed handle. In step 2501, the function selects the next Visible Window Table entry starting with the first entry. In step 2502, if all the entries in the Visible Window Table have already been selected, then the function returns, else the function continues at step 2503. In step 2503, if the handle of the selected Visible Window Table entry equals the passed handle, then the function continues at step 2504, else the function loops to step 2501 to select the next Visible Window Table entry. In step 2504, the function sets the MinMax field of the selected Visible Window Table entry to the passed MinMax value and returns.

Figure 26:
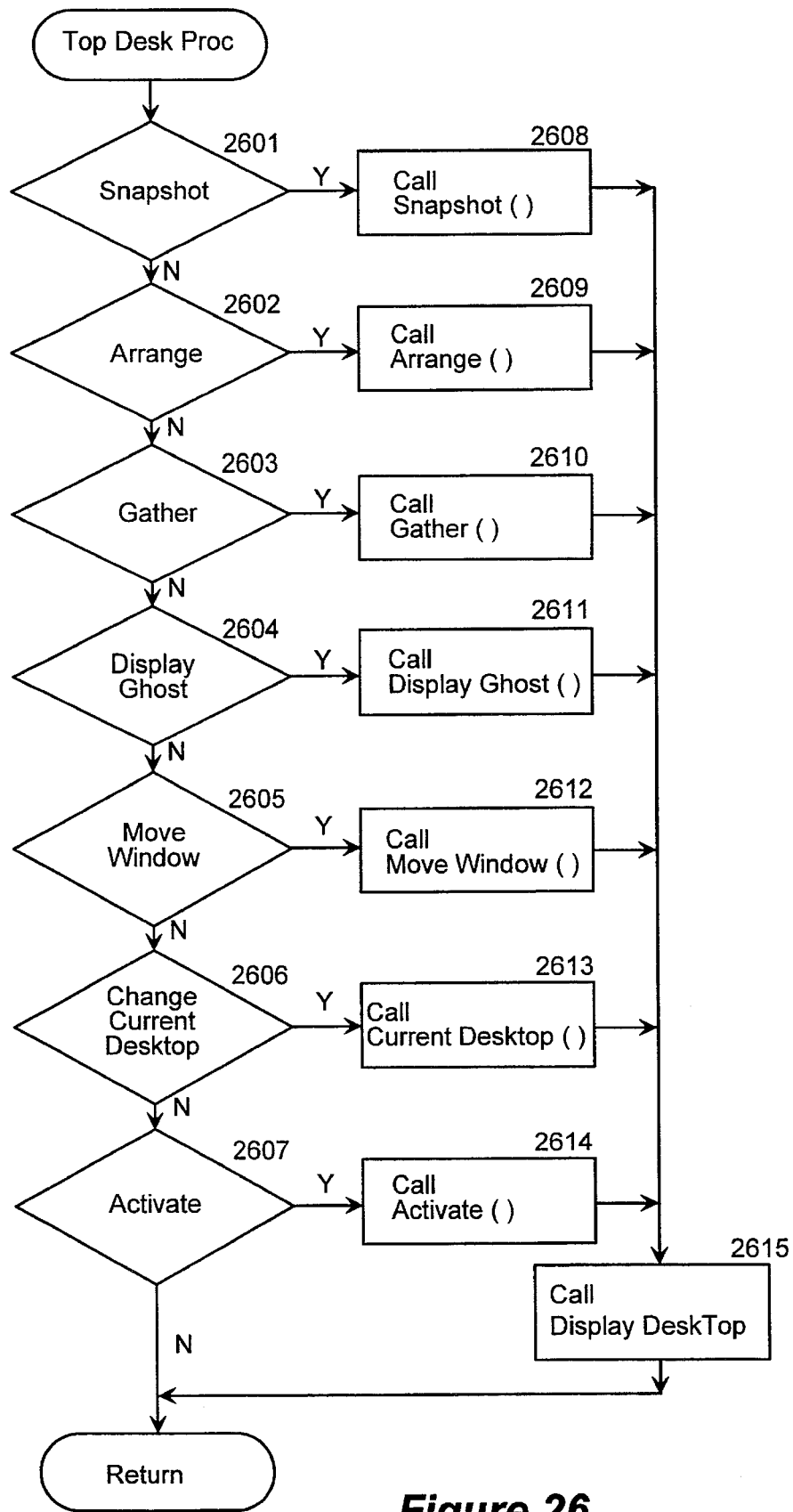
FIG. 26 is a flow diagram of the TopDesk window procedure.

FIGS. 26 through 34 are flow diagrams of functions implementing the window procedure for the TopDesk window. FIG. 26 is a flow diagram of the TopDesk window procedure. In steps 2601 through 2607, the procedure determines which event caused the invocation of the TopDesk window procedure. The events include taking a snapshot, arranging the visible windows, gathering the visible windows, and selecting whether to display ghost windows. The events also include moving a visible window or a ghost window, changing the current desktop, or activating the program associated with a visible window. One skilled in the art would appreciate that low level events (e.g., mouse button down and mouse movement) are typically passed to a window procedure. The steps 2601–2607 represent the functional results of determinations using these low level events. The procedure invokes a function to process each of these events. In steps 2608 through 2614, the procedure invokes these functions. In step 2615, the procedure calls function DisplayDeskTop to display the virtual desktop and the current desktop and then the procedure returns.

Figure 27:
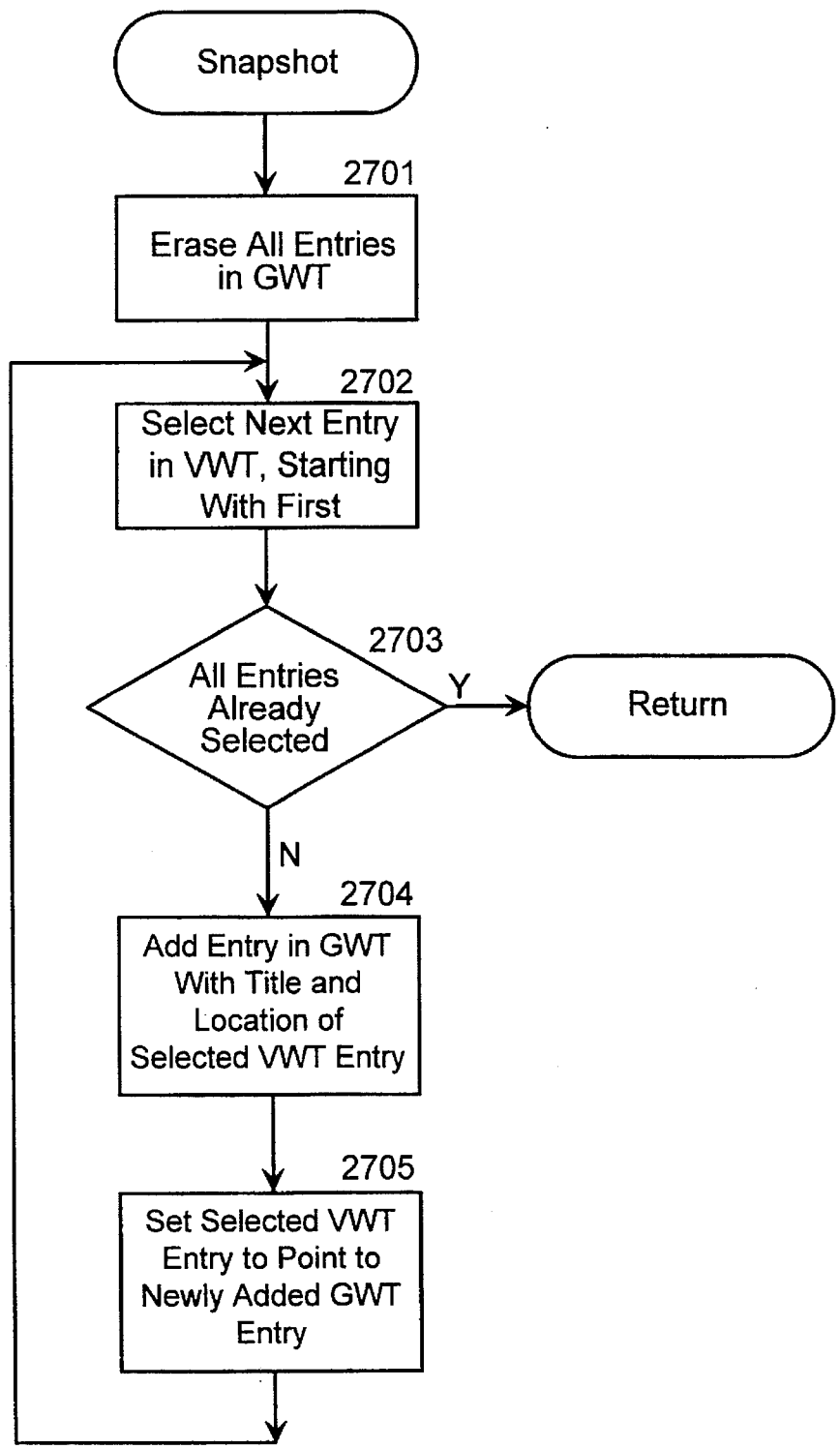
FIG. 27 is a flow diagram of the function Shapshot.

FIG. 27 is a flow diagram of the function Snapshot. The function Snapshot erases the current Ghost Window Table and generates the Ghost Window Table based on the information the Visible Window Table. In an alternate embodiment, an erase option is provided to erase the Ghost Window Table, and the snapshot option does not erase the Ghost Window Table, but rather it adds new entries to the Ghost Window Table for those visible windows with no corresponding ghost windows. In step 2701, the function removes all entries from the Ghost Window Table. In steps 2702 through 2705, the function loops adding an entry to the Ghost Window Table for each entry in the Visible Window Table. In step 2702, the function selects the next entry in the Visible Window Table starting with the first entry. In step 2703, if all the entries have been selected, then the function returns, else the function continues at step 2704. In step 2704, the function adds an entry into the Ghost Window Table with a Title field and Location field equal to that of the selected Visible Window Table entry. In step 2705, the function sets the selected Visible Window Table entry to point to the newly added Ghost Window Table entry and loops to step 2702 to select the next entry in the Visible Window Table.

Figure 28:
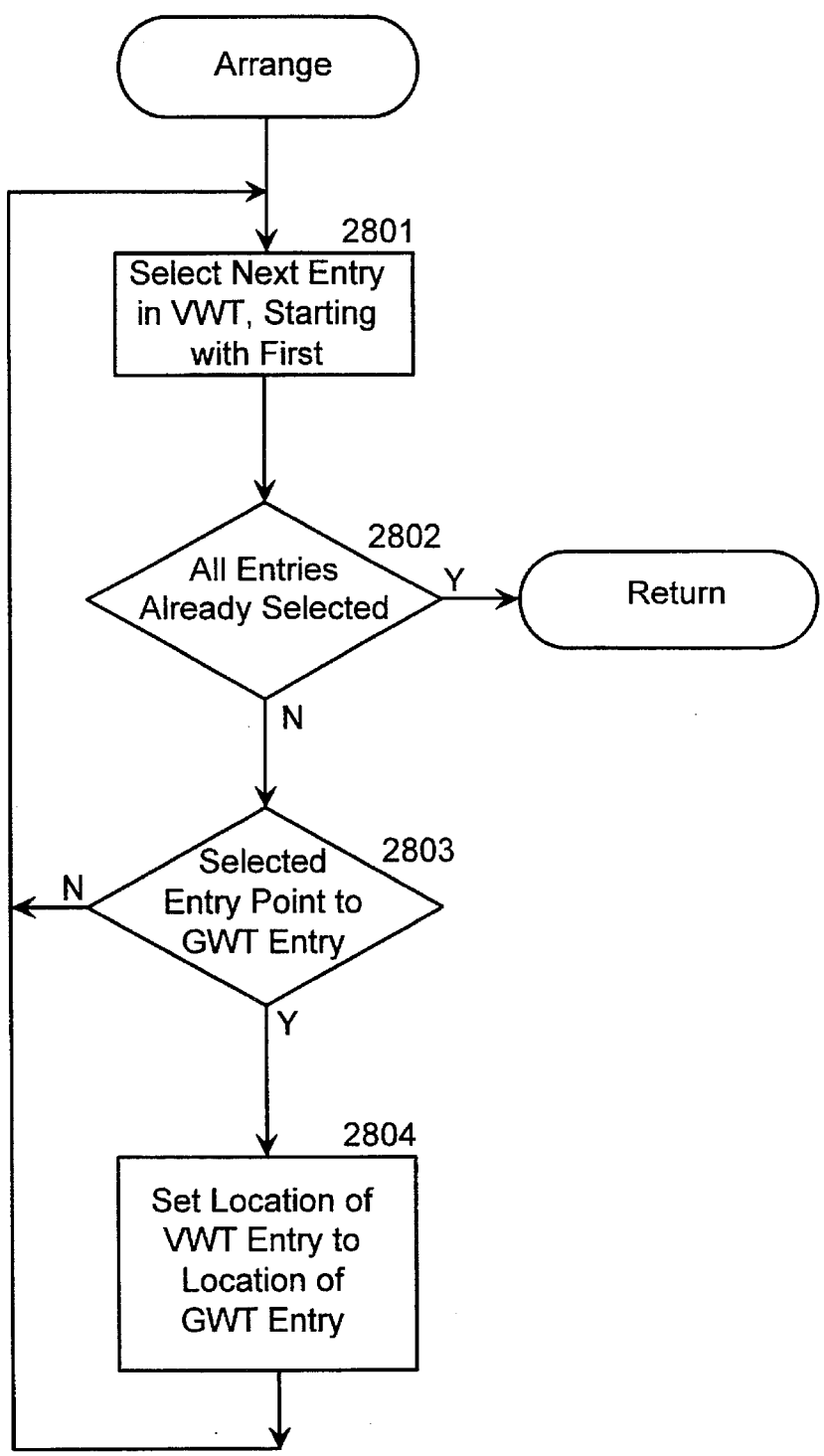
FIG. 28 is a flow diagram of the function Arrange.

FIG. 28 is a flow diagram of the function Arrange. The function Arrange changes the size and location of each visible window to that of its corresponding (pointed to) ghost window. In step 2801, the function selects the next entry in the Visible Window Table starting with the first entry. In step 2802, if all entries in the Visible Window Table have already been selected, then the function returns, else the function continues at step 2803. In step 2803, if the selected Visible Window Table entry points to a Ghost Window Table entry, then the function continues at step 2804, else the function loops to step 2801 to select the next entry in the Visible Window Table. In step 2804, the function sets the size and location of the selected Visible Window Table entry to the size and location of the pointed to Ghost Window Table entry and loops to step 2801 to select the next entry in the Visible Window Table.

Figure 29:
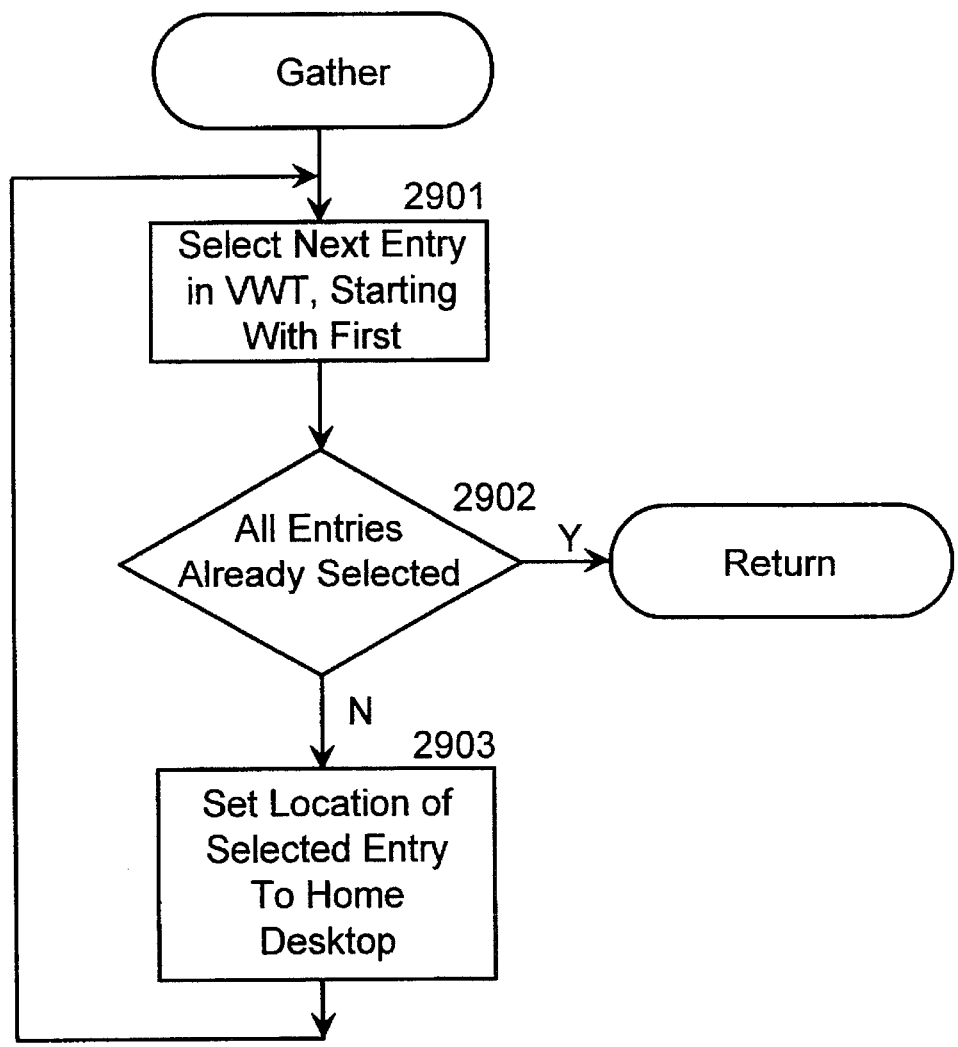
FIG. 29 is a flow diagram of the function Gather.

FIG. 29 is a flow diagram of the function Gather. The function Gather changes the location of each visible window to be positioned within the home desktop. In step 2901, the function selects the next entry in the Visible Window Table starting with the first entry. In step 2902, if all entries in the Visible Window Table have already been selected, then the function returns, else the function continues at step 2903. In step 2903, the function sets the location of the selected Visible Window Table entry to a location within the home desktop and loops to step 2901 to select the next entry in the Visible Window Table.

Figure 30:
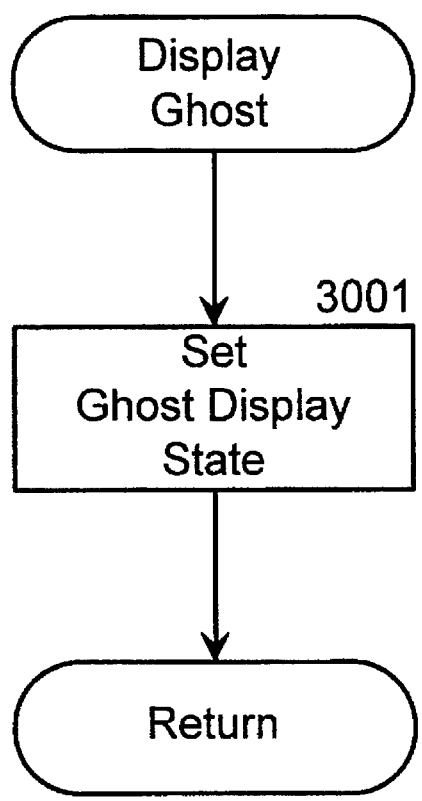
FIG. 30 is a flow diagram of the function DisplayGhost.

FIG. 30 is a flow diagram of the function DisplayGhost. The function DisplayGhost is passed a flag indicating whether the ghost windows should be displayed on the virtual desktop. In step 3001, the function sets a flag indicating the state of the ghost window display and returns.

Figure 31:
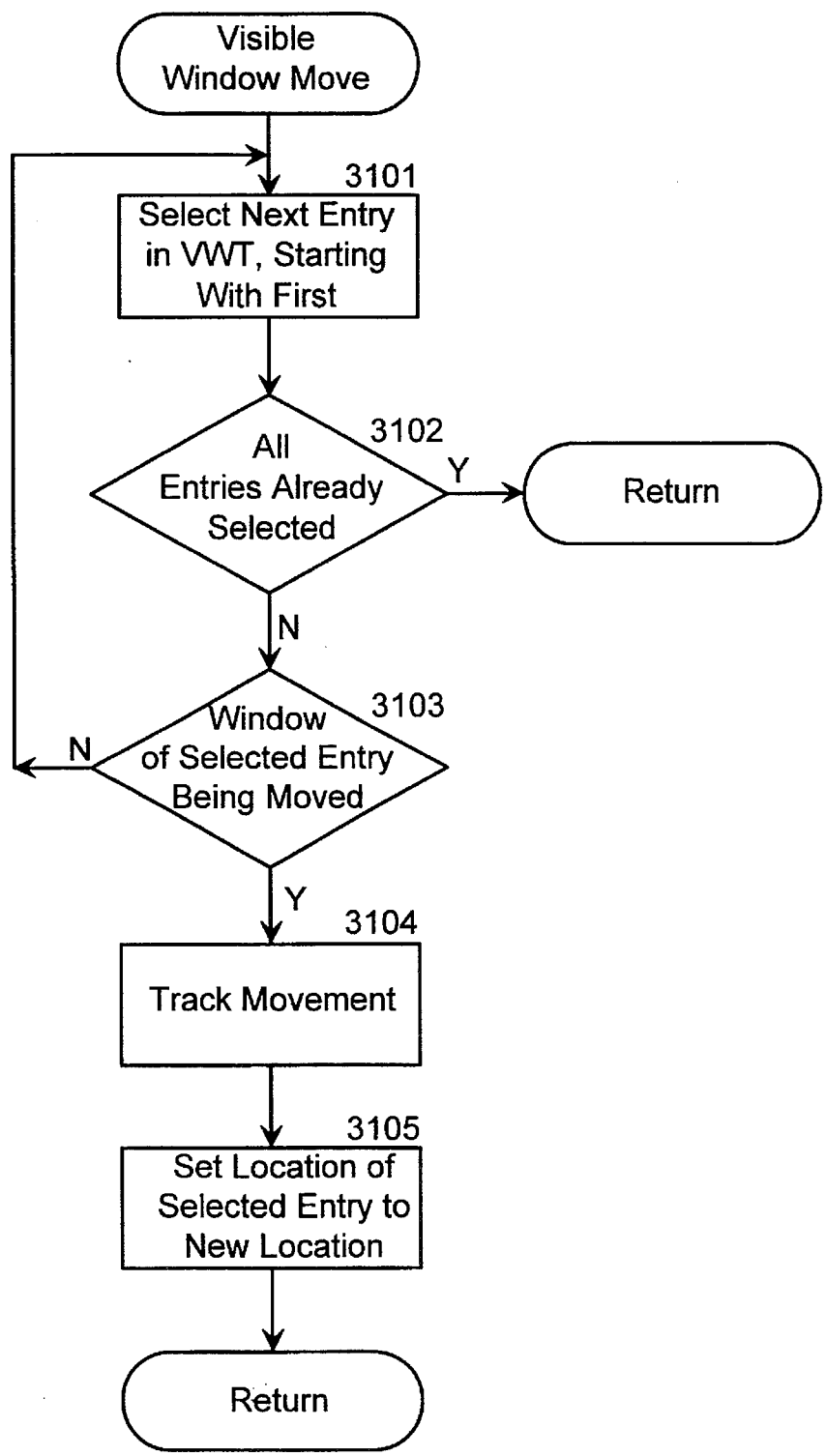
FIG. 31 is a flow diagram of the function VisibleWindowMove.

FIG. 31 is a flow diagram of the function VisibleWindowMove. The function VisibleWindowMove tracks the selection and dragging of a visible window on the virtual desktop and updates the locaton of the corresponding entry in the Visible Window Table. A preferred embodiment implements an analogous ghost window move function. In step 3101, the function selects the next entry in the Visible Window Table starting with the first entry. In step 3102, if all entries in the Visible Window Table have already been selected, then the function returns, else the function returns at step 3103. In step 3103, if the selected entry is the dragged window, then the function continues at step 3104, else the function loops to step 3101. In step 3104, the function tracks the movement of the dragged window. In step 3105, the function sets the location of the selected Visible Window Table entry to the new location and returns.

Figure 32:
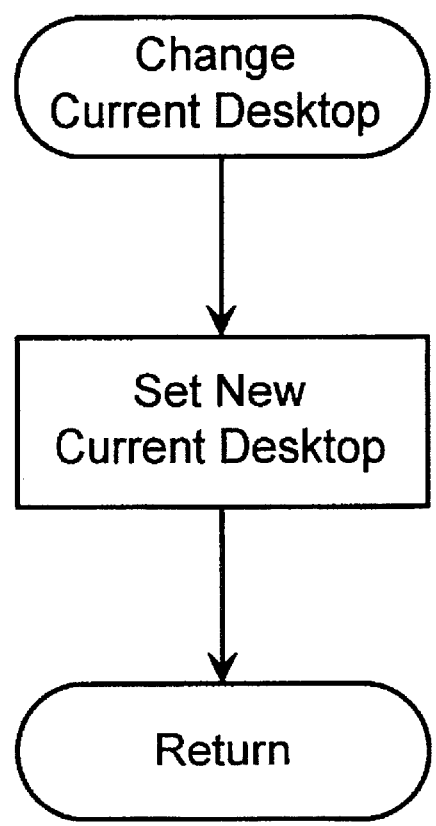
FIG. 32 is a flow diagram of the function ChangeCurrentDeskTop.

FIG. 32 is a flow diagram of the function ChangeCurrentDeskTop. The function ChangeCurrentDeskTop sets the current desktop to the passed desktop and returns.

Figure 33:
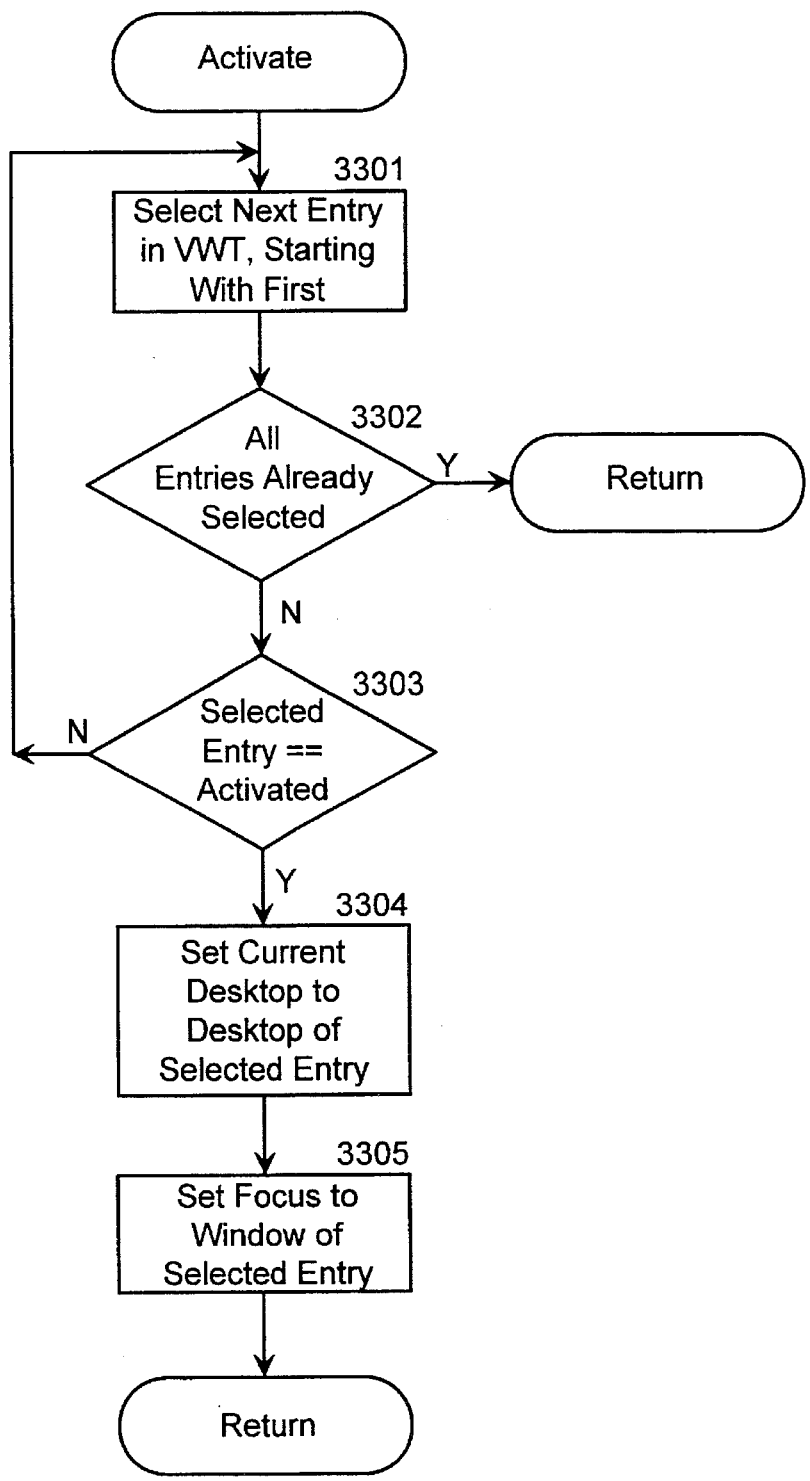
FIG. 33 is a flow diagram of the function Activate.

FIG. 33 is a flow diagram of the function Activate. The function Activate determines which visible window is being activated (right mouse button down) and resets the current desktop and gives the focus to the visible window. If a ghost window is being activated, then the function ActivateGhost is invoked. In step 3301, the functions selects the next entry in the Visible Window Table starting with the first entry. In step 3302, if all entries in the Visible Window Table have already been selected, then the function returns, else the function continues at step 3303. In step 3303, if the selected Visible Window Table entry corresponds to the visible window to be activated, then the function continues at step 3304, else the function continues at step 3301 to select the next entry in the Visible Window Table. In step 3304, the function sets the current desktop to the desktop that contains the visible window to be activated. In step 3305, the function adjusts the Z-order to indicate that the selected visible window is the topmost and returns.

Figure 34:
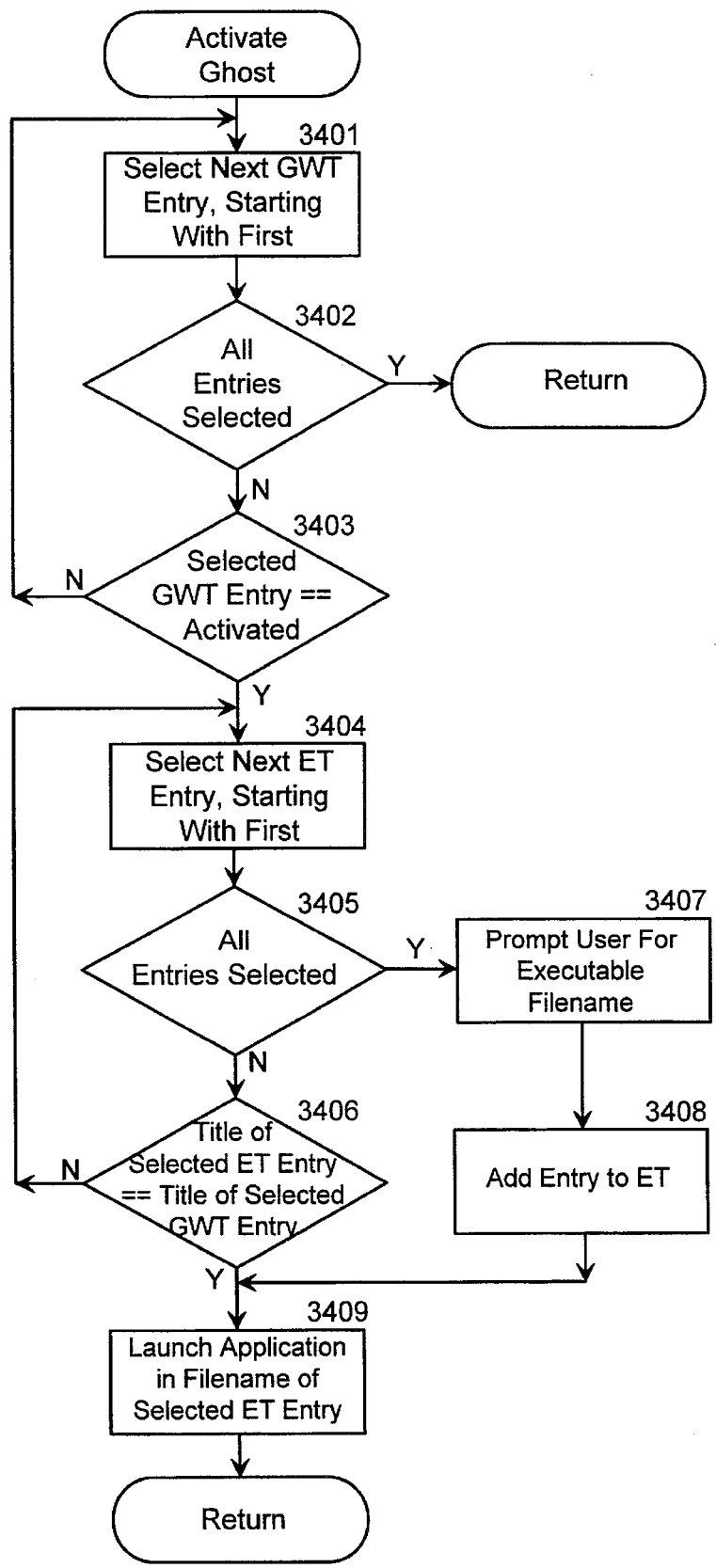
FIG. 34 is a flow diagram of the function ActivateGhost.

FIG. 34 is a flow diagram of the function ActivateGhost. The function ActivateGhost determines which ghost window (right mouse button down) is to have its program activated, searches the Executable Table for an entry with the title corresponding to the title of the determined ghost window, and activates that program. If there is no corresponding entry in the Executable Table, the function prompts the user for a file name that contains the executable code for the program, adds an entry to the Executable Table, and then activates that program. If the program is already activated, then the function moves the visible window to coincide with the ghost window. In step 3401, the function selects the next Ghost Window Table entry starting with the first entry. In step 3402, if all entries in the Ghost Window Table are already selected, then the function returns, else the function continues at step 3403. In step 3403, if the selected Ghost Window Table entry corresponds to the ghost window to be activated, then the function continues at step 3404, else the function loops to step 3401 to select the next Ghost Window Table entry. In steps 3404 through 3406, the function searches the Executable Table for an entry with the same title as the selected Ghost Window Table entry. In step 3404, the function selects the next Executable Table entry starting with the first entry. In step 3405, if all entries from the executable table have been selected, then the function continues at step 3407, else the function continues at step 3406. In step 3406, if the title of the selected Executable Table entry equals the title of the selected Ghost Window Table entry, then the function continues at step 3409, else the function loops to step 3404 to select the next Executable Table entry. In step 3409, the function activates the program by executing the code indicated by the FileName field of the selected Executable Table entry and returns. In step 3407, the function prompts the user for the file name of the file that contains the executable code for the program to be associated with the ghost window. In step 3408, the function adds an entry to the Executable Table with the title corresponding to the title of the selected ghost window entry and the user entered file name and continues at step 3409.

Figure 35:
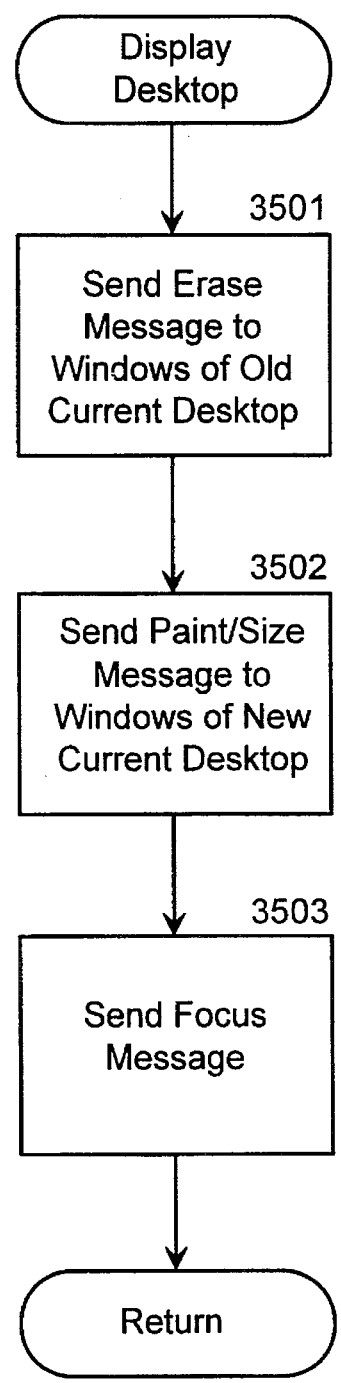
FIG. 35 is a flow diagram of the function DisplayDesktop.

FIG. 35 is a flow diagram of the function DisplayDesktop. This function controls the displaying of the desktop configuration on the display device for the current desktop. In step 3501, the function sends erase messages to those windows that are no longer visible on the current desktop. In step 3502, the function sends paint and resize messages to those windows that are now visible as appropriate to effect the display of the current desktop configuration in accordance with the Visible Window Table. In step 3503, the function ensures that the appropriate window has the input focus and returns.

Figure 36:
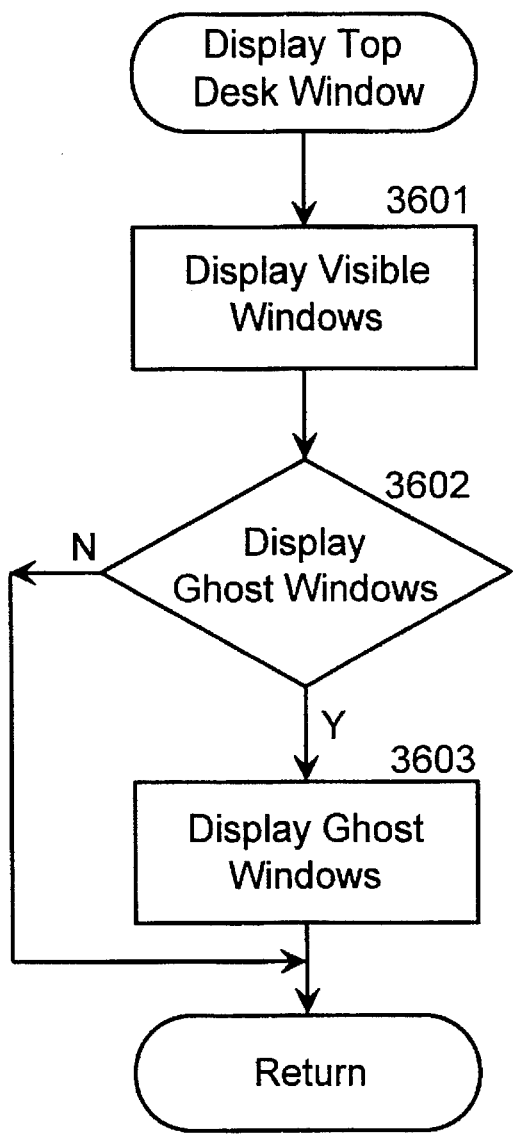
FIG. 36 is a flow diagram of the function DisplayDesktopWindow.

FIG. 36 is a flow diagram of the function DisplayDeskTopWindow. This function is invoked by the TopDesk window procedure to update the TopDesk window display. In step 3601, the function displays the visible windows based on the information in the Visible Window Table. In step 3602, if the ghost window display flag is set, then the function displays the ghost windows based on information in the Ghost Window Table. The function then returns.

Although the present invention has been described in terms of a preferred embodiment, it is not intended that the invention be limited to this embodiment. Modifications within the spirit of the invention will be apparent to those skilled in the art, the scope of the present invention is defined by the claims which follow.

I claim:

1. A method in a computer system for representing a window configuration of a window of a program when the program is inactive, the method comprising the steps of:

determining the window configuration of the window of the program when the program is active;

storing the determined window configuration;

setting the program to inactive; and when the program is inactive, displaying a representation of the determined window configuration and an indication that the program is inactive.

2. The method of claim 1 wherein the step of displaying a representation of the determined window configuration includes the step of displaying a rectangle representing the determined window configuration.

3. The method of claim 2 including the steps of selecting the displayed rectangle, specifying a new window configuration, and modifying the stored determined window configuration to reflect the new window configuration.

4. A method in a computer system for representing a size and location of a window for each of a plurality of programs, the method including the steps of:

activating each of the plurality of programs;

determining an initial window size and location for each of the activated programs;

saving the initial window size and location for each of the activated programs;

inactivating one of the activated programs;

displaying a representation of the initial window size and location of each active program and an indication that each active program is active; and displaying a representation of the initial window size and location of the inactive program and an indication that the inactive program is inactive.

5. The method of claim 4 wherein the step of displaying a representation of the initial window size and location of the inactive program includes the step of displaying a rectangle representative of the initial window size and location of the inactive program.

6. The method of claim 4 including the step of selecting the representation of the initial window size and location to effect the activation of the inactive program.

7. The method of claim 4 including the steps of activating the inactive program, and displaying a representation of the initial window size and location of the activated program and an indication that the activated program is active.

8. The method of claim 4 including the steps of activating the inactive program, assigning the activated program the initial window size and location, and displaying a representation of the initial window size and location of the activated program and an indication that the activated program is active.

9. The method of claim 4 including the steps of modifying the initial window size or location of the inactive program, determining a modified window size or location of the inactive program, saving the modified window size or location, and displaying a representation of the modified window size or location of the inactive program and an indication that the inactive program is inactive.

10. The method of claim 9 wherein the step of displaying a representation of the modified window size or location of the inactive program includes the step of displaying a rectangle representative of the modified window size or location of the inactive program and including the steps of selecting the rectangle and moving the rectangle to reflect the modified window size or location of the inactive program.

11. The method of claim 4 including the steps of modifying the initial window size or location of an active program and in response to a request from a user, reconfiguring the modified window size or location of each active program to the initial window size and location.

12. The method of claim 4 including the steps of in response to a request from a user reconfiguring the window size and location of each active program to a predefined window size and location.

13. The method of claim 12 including the step of in response to a request from a user, reconfiguring the window size and location of each active program to the initial window size and location.

14. A method in a computer system for representing a window configuration of a window of a program when the program is inactive, the method comprising the steps of:

determining the window configuration of the window of the program when the program is active;

setting the program to inactive; and when the program is inactive, displaying a rectangle representing the determined window configuration and an indication that the program is inactive.

15. A method in a computer system for representing a size and location of a window for each of a plurality of programs, the method including the steps of:

activating each of the plurality of programs;

determining an initial window size and location for each of the activated programs;

inactivating one of the activated programs;

displaying a representation of the initial window size and location of each active program and an indication that each active program is active; and displaying a rectangle representative of the initial window size and location of the inactive program and an indication that the inactive program is inactive.

16. A system for representing a size and location of a window of a program when the program is inactive, the system comprising:

a processor for determining the window size and location of the program when the program is active and for setting the program to inactive;

a memory for storing the determined window size and location; and a display device for, when the program is inactive, displaying a representation of the determined window size and location and an indication that the program is inactive.

17. A system for representing a window configuration for each of a plurality of programs, the system comprising:

a processor for activating each of the plurality of programs, for determining an initial window configuration for each of the activated programs, and for inactivating one of the activated programs;

a memory for saving the initial window configuration for each of the activated programs; and a display device for displaying a representation of the initial window configuration of each active program and an indication that each active program is active, and for displaying a representation of the initial window configuration of the inactive program and an indication that the inactive program is inactive.

* * * * *